US012564285B2

(12) United States Patent
Adimulam et al.

(10) Patent No.: US 12,564,285 B2
(45) Date of Patent: Mar. 3, 2026

(54) BOTTLE CLEANING DEVICE WITH A FLUID DISPENSER

(71) Applicant: Suresh Babu Adimulam, Visakhapatnam (IN)

(72) Inventors: Suresh Babu Adimulam, Visakhapatnam (IN); Sanandan Sudhir, Ahmedabad (IN); Tirtha Mandal, Kolkata (IN); Akshay Kumar, Daulatpur (IN); Maulik Soni, Gandhinagar (IN)

( * ) Notice: Subject to any disclaimer, the term of this patent is extended or adjusted under 35 U.S.C. 154(b) by 312 days.

(21) Appl. No.: 18/575,702

(22) PCT Filed: Jun. 30, 2022

(86) PCT No.: PCT/IB2022/056105
§ 371 (c)(1),
(2) Date: Dec. 29, 2023

(87) PCT Pub. No.: WO2023/275815
PCT Pub. Date: Jan. 5, 2023

(65) Prior Publication Data
US 2024/0306844 A1 Sep. 19, 2024

(30) Foreign Application Priority Data
Jun. 30, 2021 (IN) .............................. 202141029309

(51) Int. Cl.
*A47J 31/60* (2006.01)
*B08B 3/10* (2006.01)
(Continued)

(52) U.S. Cl.
CPC .............. *A47J 31/60* (2013.01); *B08B 3/104* (2013.01); *B08B 7/0057* (2013.01); *B08B 9/423* (2013.01); *B08B 2209/08* (2013.01)

(58) Field of Classification Search
CPC ........ A47J 31/60; B08B 3/104; B08B 7/0057; B08B 9/423; B08B 2209/08;
(Continued)

(56) References Cited

U.S. PATENT DOCUMENTS 8,294,126 B2 * 10/2012 Humele .................. H01J 33/00
53/426

FOREIGN PATENT DOCUMENTS

CN 204159628 U 2/2015
CN 109174871 A 1/2019

OTHER PUBLICATIONS

International Search Report from International Application No. PCT/IB2022/056105 mailed Oct. 18, 2022.

* cited by examiner

*Primary Examiner* — Rita P Adhlakha
(74) *Attorney, Agent, or Firm* — Novel Patent Services LLC

(57) ABSTRACT

The present disclosure provides a compact and automated single device capable of washing, drying, and sterilizing a bottle and its accessories, along with preparing and filing milk in the cleaned bottle. The device receives the bottle and the accessories in two separate towers, and wash them properly by creating a whirl of heated water inside and around the bottle and accessories. Further, the device dries the washed bottle and accessories with clean and filtered heated air to prevent contamination of the bottle and accessories during drying. UV lights are also provided inside the two towers to completely sterilize the dried bottle and accessories to kill any microorganism present on their surface. The device further includes an inbuilt milk dispenser to prepare and dispense milk in the cleaned bottle. The device is remotely operable as well as monitorable by users using mobile devices.

14 Claims, 28 Drawing Sheets

(51) Int. Cl.
     *B08B 7/00*          (2006.01)
     *B08B 9/42*          (2006.01)
(58) Field of Classification Search
     CPC ....... B08B 9/0804; B08B 9/0821; B08B 9/22;
                    A61L 2202/14; A61L 2/10; A61L 2/24;
                        A61L 2202/16; A61L 2202/17; A61L
                                                    2202/23
     See application file for complete search history.

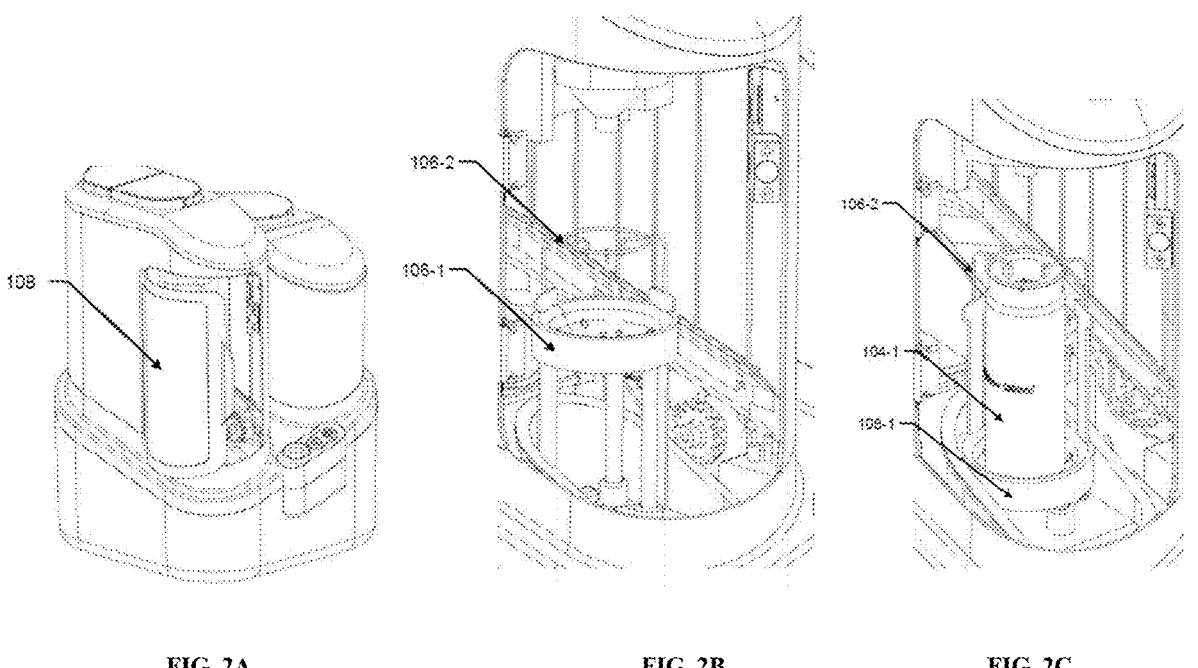
FIG. 2A                    FIG. 2B                    FIG. 2C

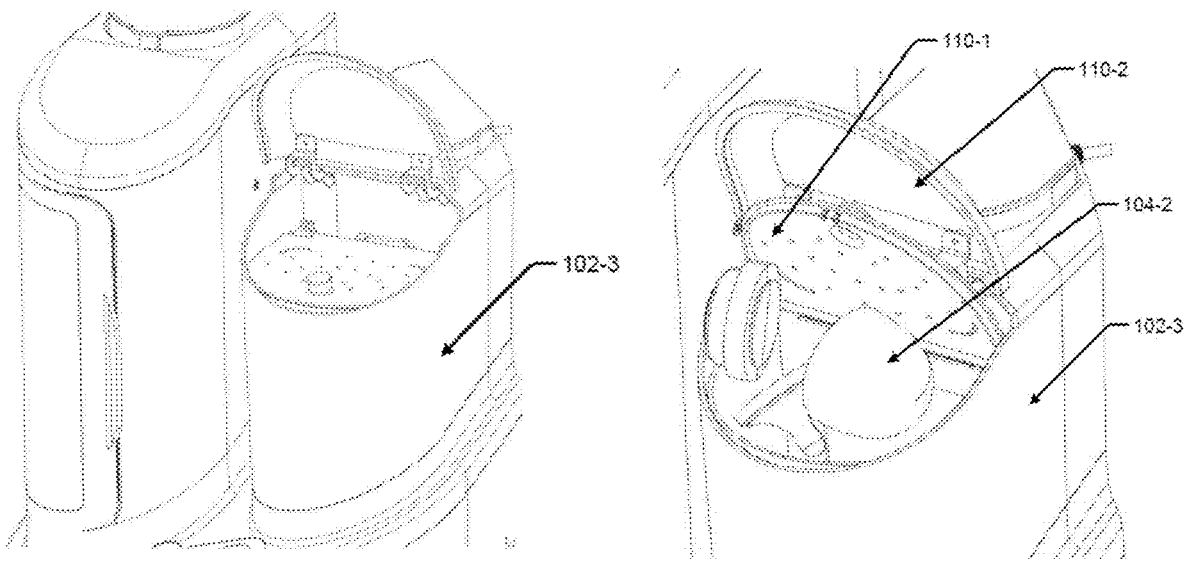
FIG. 4A
FIG. 4B
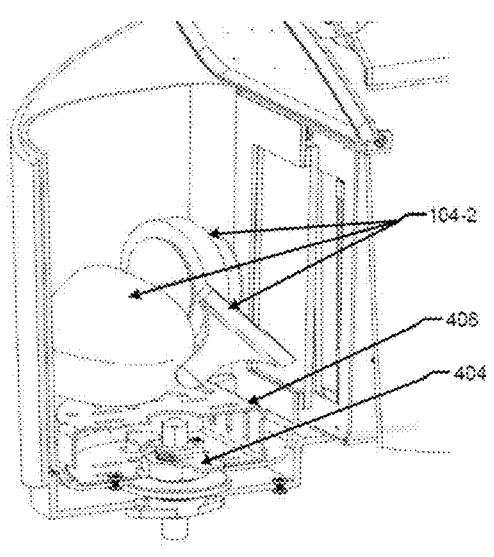
FIG. 4C
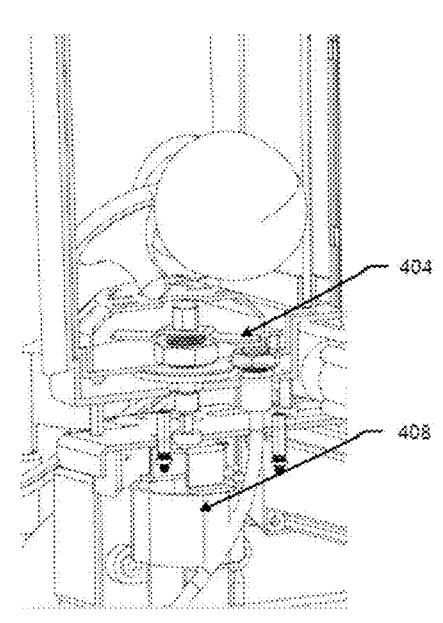
FIG. 4D

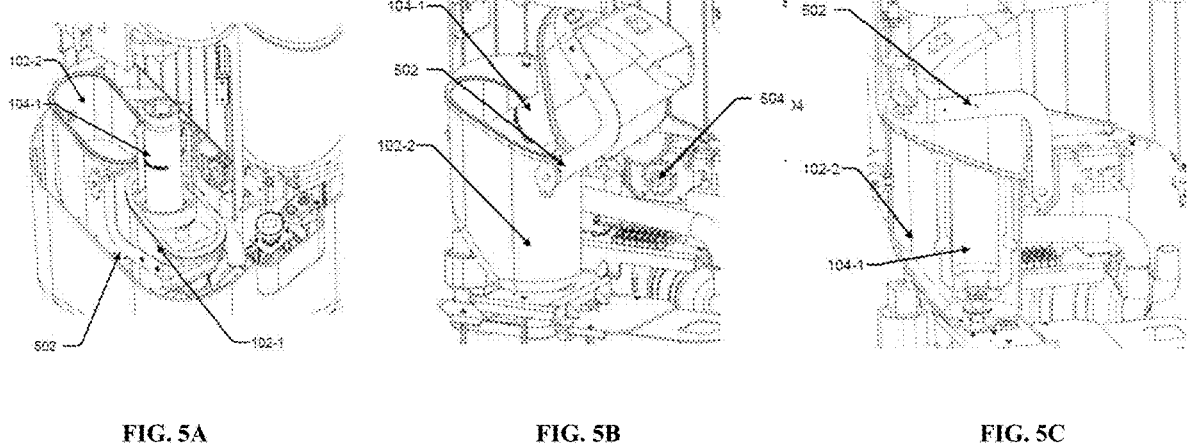
FIG. 5A                    FIG. 5B                    FIG. 5C

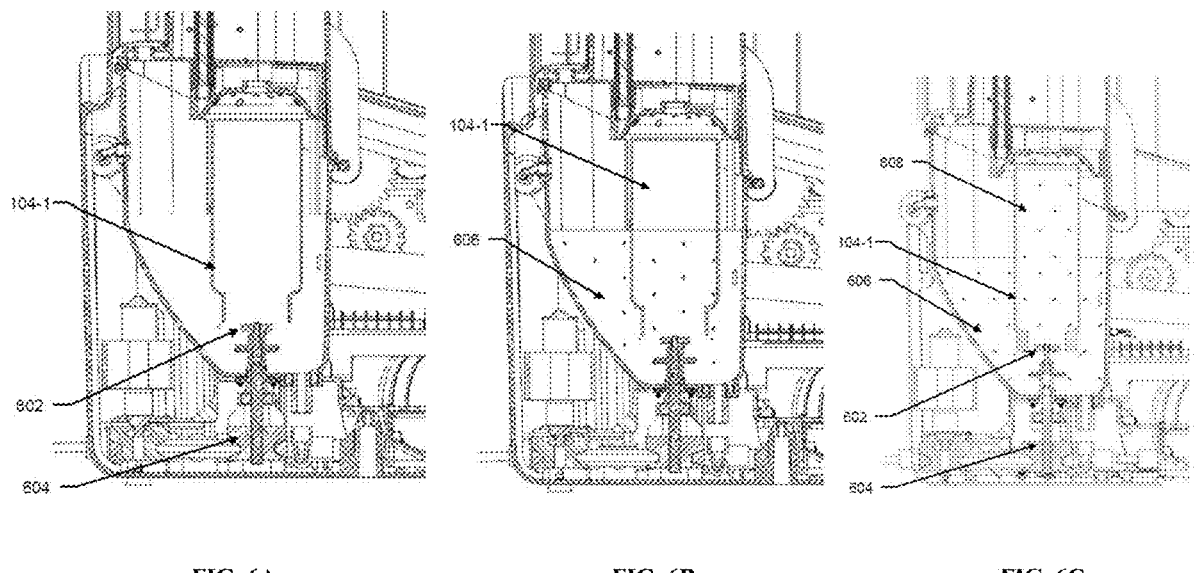
FIG. 6A                    FIG. 6B                    FIG. 6C

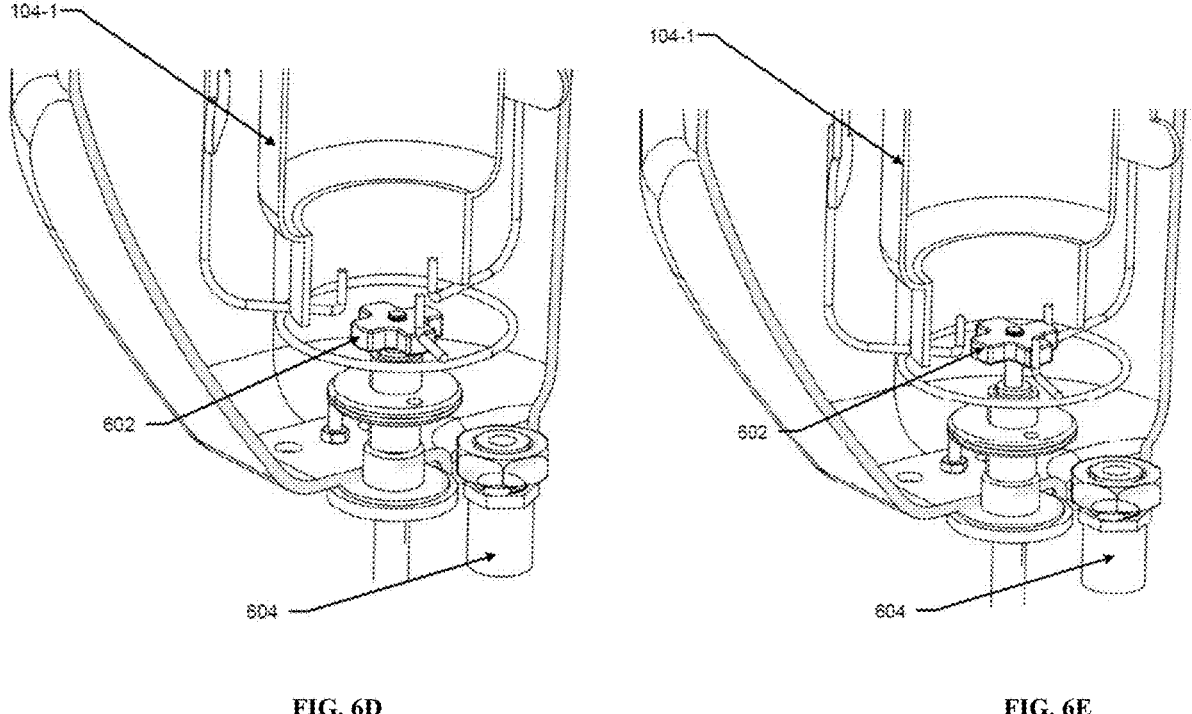
FIG. 6D                                    FIG. 6E

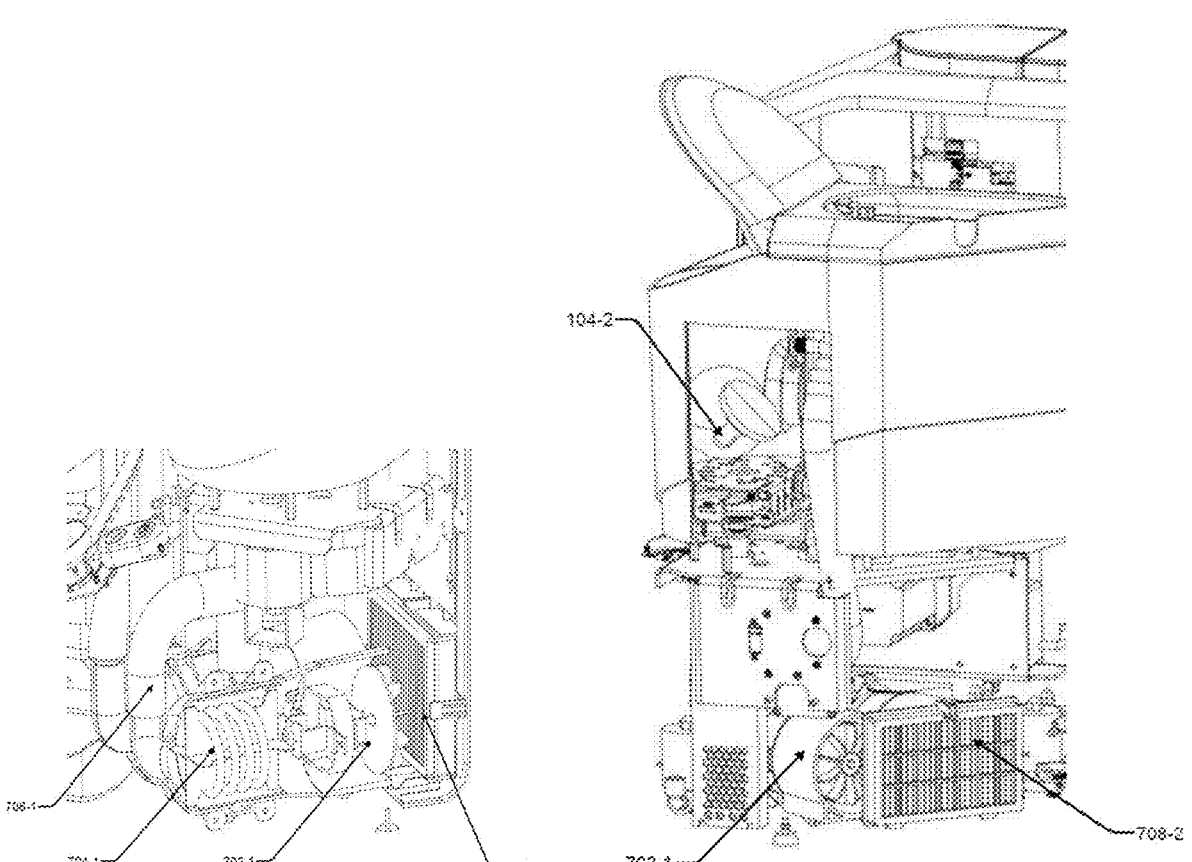
FIG. 7A                    FIG. 7B

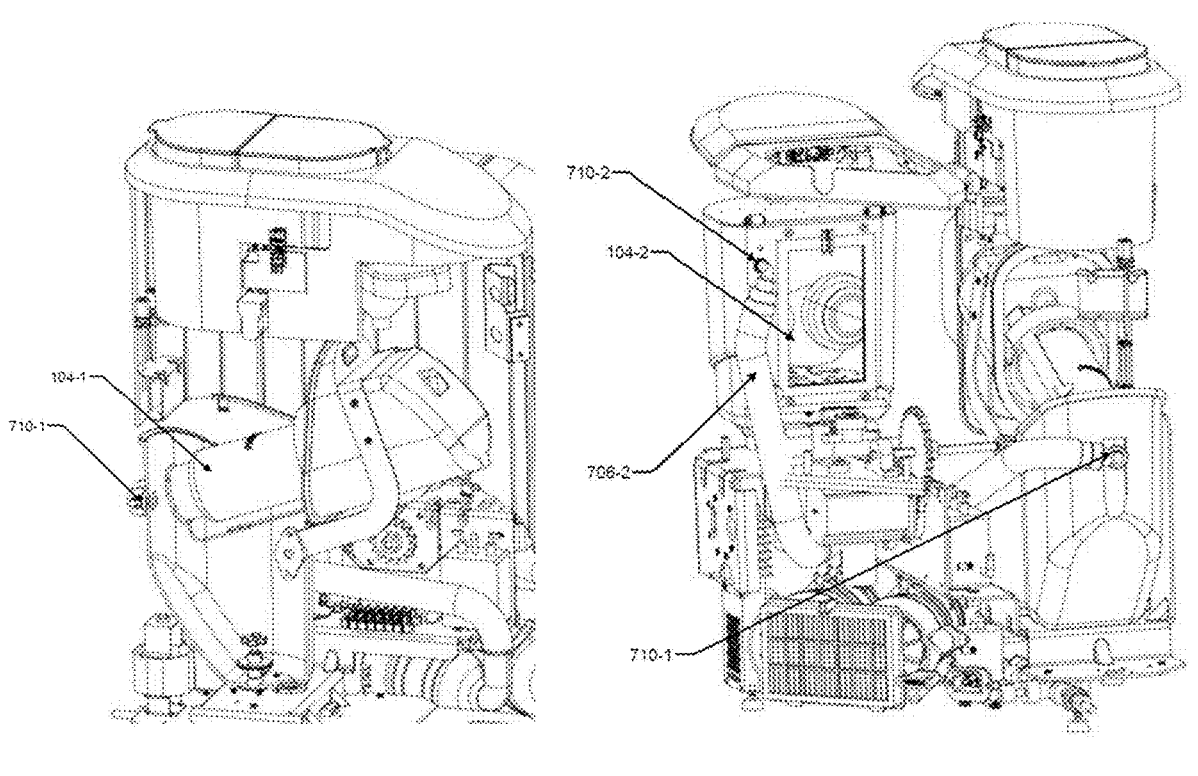
FIG. 7C                              FIG. 7D

FIG. 9A                    FIG. 9B

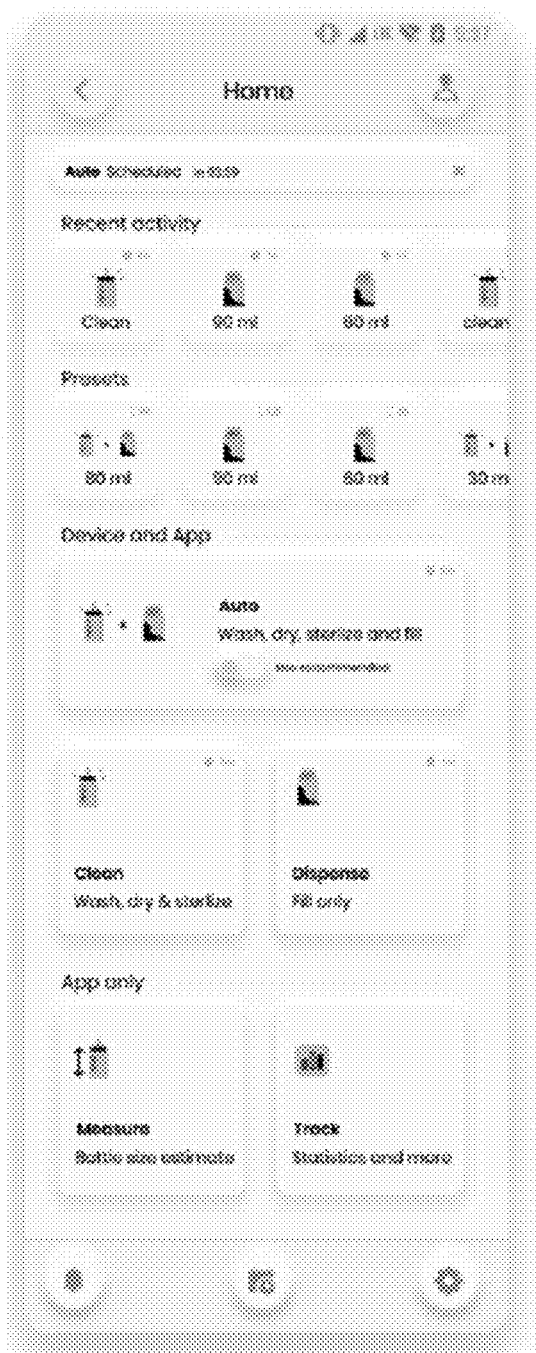
FIG. 13

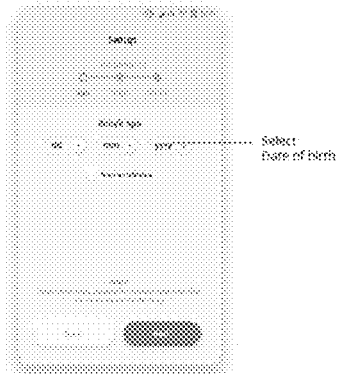
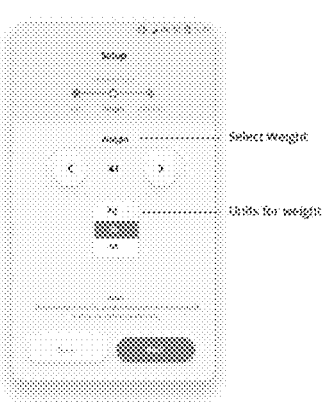
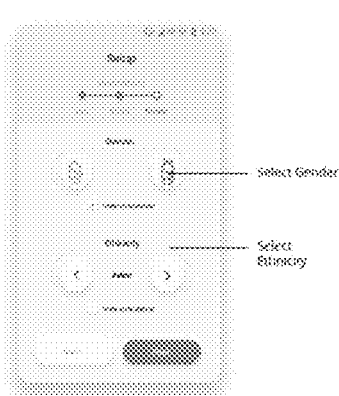
FIG. 14

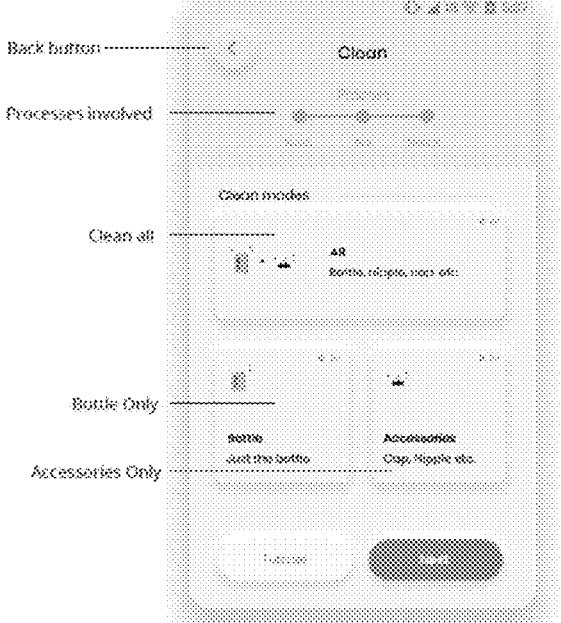
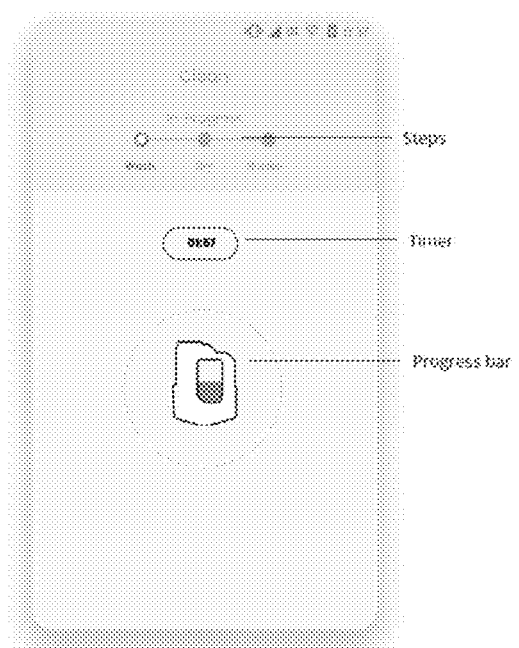
FIG. 19

Save as preset

Bottle size

Dispense

Temperature scale

Qualitative description

Cold    Luke Warm    Warm    Warmer    Hot

Complete scale

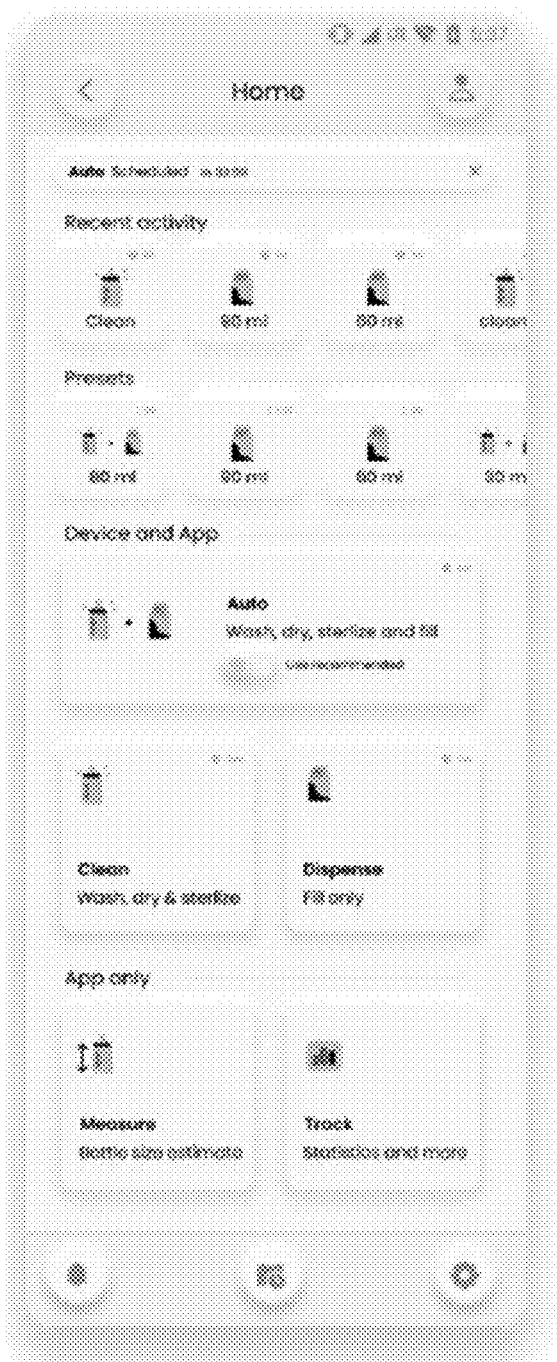
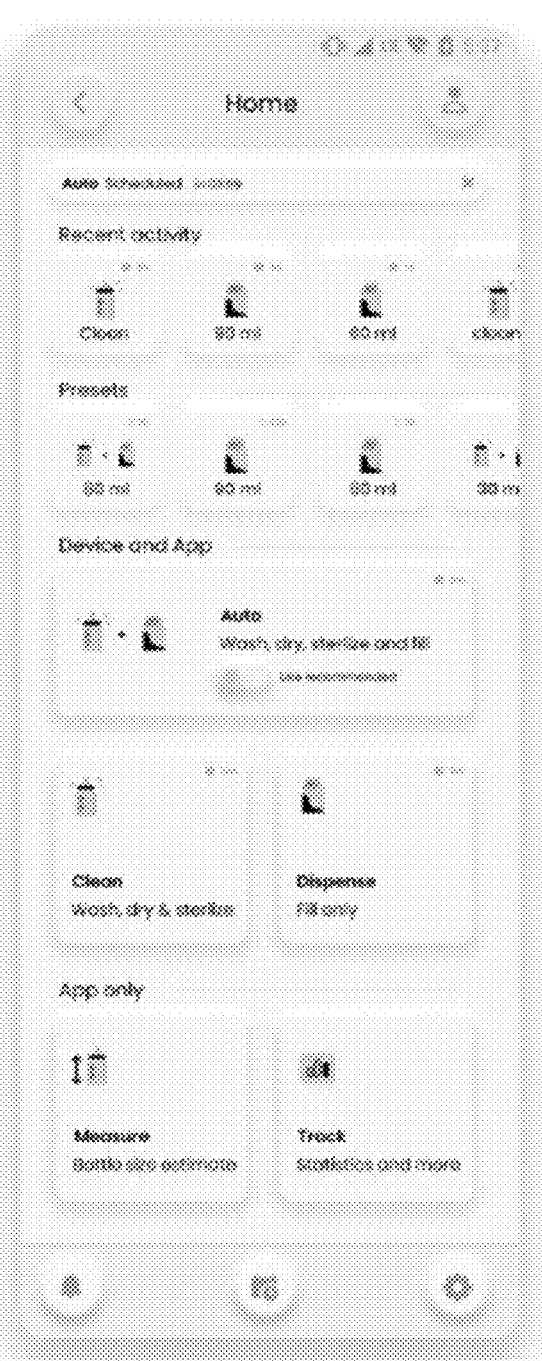
FIG. 24

BOTTLE CLEANING DEVICE WITH A FLUID DISPENSER

TECHNICAL FIELD

The present disclosure relates generally to the field of cleaning devices and fluid dispensers. In particular, the present disclosure relates to a portable, automated, efficient, and remotely operable bottle cleaning device for cleaning, drying, and sterilizing bottles and corresponding accessories, and which can automatically fill fluid such as milk, and water in the cleaned bottle.

BACKGROUND

Background description includes information that may be useful in understanding the present invention. It is not an admission that any of the information provided herein is prior art or relevant to the presently claimed invention, or that any publication specifically or implicitly referenced is prior art.

Cleaning any item is necessary to maintain hygiene. If an item, such as a plate, bottle, glass, etc, is left after usage, without cleaning then it may lead to the growth of bacteria and other microorganisms over the item. Further, if a person comes in contact with such microorganisms, then they may lead to allergy and other such health issues to the person. In severe cases, the person may fall ill also, or the microorganisms may adversely affect the person. Specifically, with babies, any microorganism present over milk bottles and corresponding accessories such as bottle cap, filter, collar, and nipple, may adversely affect the health of babies.

Cleaning of items such as bottles and other items with conventional methods, like cleaning manually using soap and water, may not result in the complete cleaning and removal of microorganisms from the item. Even when cleaning is done taking great care, then also some of the microorganisms may remain stuck at the item, especially in items like bottles or other vessels with uneven surfaces.

Conventional systems facilitate automatic cleaning of such items which may save a lot of time and effort of a person. However, they do not enable proper washing, drying, and sterilizing of the items, leading to a threat that the microorganisms may remain intact to the item or may grow again on the item due to dampness. In addition, conventional systems are capable of cleaning baby milk bottles to some extent. However, they are not capable of re-filling the cleaned bottles with milk. Traditionally, baby milk bottles are filled manually, which may lead to further contamination of the baby milk bottles during milk filling.

There are various products available in the market for preparing milk formula and automatically filling the prepared milk in bottles. Products such ascBaby Breeze milk formula maker, Burabi milk formula maker, and Milk nanny milk formula maker, are available in the market, are capable of automatically preparing milk formula for babies and filling the prepared milk in bottles. However, these products are not at all capable of washing, drying, or sterilizing the bottle as well as the accessories before filling the milk, which may contaminate the milk and may affect the health of the baby.

In addition, products such as Truemom milk formula maker, and Chinese milk formula maker, available in the market, are capable of sterilizing the bottle to some extent before filling the prepared milk formula in the bottle. These products use steam to sterilize the bottles and accessories and require manual washing of the bottles before steam sterilization. The steam may sterilization of facilitate the bottles and accessories, however, even when steam sterilization is done taking great care, then also some of the microorganisms may remain stuck at the surface of the bottle and accessories, especially on uneven surfaces. Thus, these products fail to efficiently and completely wash, dry, and sterilize the bottles and accessories.

Further, products such as Wabi sterilizer and dryer, and Vital baby pro UV sterilizer and dryer, available in the market, are capable of UV sterilization and drying of the bottles and accessories. However, these products require manual washing of the bottles before UV sterilization and drying. Further, these products are not at all capable of preparing and filing milk formula in bottles.

All the products available in the market are either capable of steam and UV-based sterilization of a bottle, or drying of a bottle, or preparing and filing milk formula in the bottle. However, none of these products are capable of washing, drying, and sterilizing bottles and accessories, along with the capability of preparing and filling milk in the cleaned bottle in the same single device.

There is, therefore, a requirement in the art to provide a solution for obviating mentioned problems and to facilitate proper and automated cleaning, sterilization, and drying of one or more items, specifically bottles and corresponding accessories. Further, there is a need to provide an automated device capable of washing, sterilizing, and drying bottles and corresponding accessories in a single device, which can be remotely controlled and can also prepare and automatically fill milkin the cleaned bottle.

SUMMARY

The present disclosure relates to a portable, automated, efficient, and remotely operable bottle cleaning device for cleaning, drying, and sterilizing bottles and corresponding accessories, and which can automatically fill fluid such as milk, and water in the cleaned bottle.

In an aspect, the disclosed bottle cleaning device includes a housing defining one or more compartments, and adapted to receive one or more objects selected from a bottle, and one or more accessories; and a holder movably configured within the housing. The holder is configured to receive and hold the bottle, and move the received bottle between a first position and a second position. In the first position, the holder is within a first compartment of the housing and is adapted to receive and hold the bottle, and in the second position, the holder moves to a second compartment of the housing.

In an aspect, when the holder moves the bottle to the second position, the second compartment receives a first predefined amount of water heated at a first predefined temperature, and creates a whirl of the received heated water for a first predefined time to facilitate cleaning of the bottle.

In an embodiment, the holder, in the first position, holds the received bottle in an upright position within the first compartment such that an opening of the received bottle is on top. The holder, when moving the bottle to the second compartment, is configured to turn over the bottle to upside down position such that a first set of blades in the second compartment is able to move inside and outside of the bottle to create the whirl of heated water inside and around the bottle.

In an embodiment, the second compartment may be fluidically coupled to a first container storing water, and the first container may be operatively coupled to a first heating unit to heat the stored water at the first predefined temperature. Further, the second compartment may be adapted to receive the heated water when the holder moves the bottle within the second compartment.

In an embodiment, the second compartment may include a first driving unit comprising the first set of blades being rotatably coupled to a first motor, and operable to create the whirl of the received heated water.

In an embodiment, the second compartment may be operatively coupled to a first drying unit that is configured to blow air heated at a second predefined temperature inside the second compartment to dry the water cleaned bottle. Further, the first drying unit may include a first blower configured with a first heating element to heat the air at the second predefined temperature, and supply the heated air to the second compartment though a first air nozzle provided at a first opening of the second compartment.

In an embodiment, the holder amymave the water cleaned bottle from the second position to a third position inside the housing after water cleaning, such that the opening of the water cleaned bottle is in line with the first opening of the second compartment to enable drying of inside of the bottle.

In an embodiment, at the third position, the bottle may be inclined at a first predefined angle with a longitudinal axis of the second compartment, to facilitate draining of any water from the bottle under gravity.

In an embodiment, the first drying unit may include a first air filter to filter the air before being heated and supplied to the second compartment.

In an embodiment, the second compartment may include a set of UV lights configured to sterilize the dried bottle for a predefined time.

In an embodiment, the holder may be configured to move the dried bottle from the third position to a fourth position inside the housing after drying, such that the set of UV light are around the dried bottle to enable sterilizing of the dried bottle.

In an embodiment, the holder may be configured to move the bottle back to the first position in the first first compartment after cleaning of the bottle in the second compartment, and the device may include a fluid dispenser configured with the first compartment, and configured to dispense, within the bottle, a second predefined amount of one or more fluids selected from milk, and water, heated at a predefined temperature, after the holder has moves back the cleaned bottle to the first position.

In an embodiment, the milk dispenser may include: (i) a RO water container configured to store RO purified water, and operatively coupled with a heater to heat the stored water at a third predefined temperature; (ii) a milk powder container configured to store and dispense a predefined quantity of milk powder; and (iii) a funnel connected with the RO water container and the milk powder container to receive a third predefined amount of the heated RO water and the predefined quantity of the milk powder, and create a turbine action to facilitate mixing of the milk powder and the RO purified water to prepare milk, and further dispense the prepared milk within the bottle, when the cleaned bottle moves back to the first position.

In an embodiment, the milk powder container may include a measuring disc having one or more slots, and a spatula rotatably configured over the measuring disc to dispense the predefined quantity of milk powder through the corresponding slots into the funnel.

In an embodiment, the holder may be operatively coupled to a second driving unit to move and position the holder at pre-defined positions between the first compartment to the second compartment, and wherein the second driving unit comprises a motor-gear assembly operatively coupled to the first compartment using a linkage.

In an embodiment, the holder may include: (i) an object holding mesh configured over a set of fixed pillars, the object holding mesh being made of a hard wire twisted to form a hook shaped structure, and (ii) an object holding cap configured over a set of spring-loaded pillars and positioned below the object holding mesh. The set of spring-loaded pillars, on application of a pressure on the object holding cap, may be configured to allow movement of the object holding cap away from the object holding mesh to allow positioning of the received bottle between the object holding mesh and the object holding cap. Upon releasing the applied pressure, the set of spring-loaded pillars may pushe the object holding cap towards the object holding mesh to lock the object there between.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 2A-2C illustrate exemplary views illustrating the positioning of the bottle in the first compartment of the proposed device, in accordance with an embodiment of the present invention.

FIGS. 4A-4F illustrate exemplary views of the third compartment and the whirl creating mechanism of the third compartment for cleaning accessories of the bottle, in accordance with an embodiment of the present invention.

FIGS. 5A-5C illustrate exemplary views illustrating the positioning of the bottle in the second compartment for cleaning the bottle, in accordance with an embodiment of the present invention.

FIGS. 6A-6E illustrate exemplary views of the second compartment and the whirl creating mechanism of the second compartment for cleaning the bottle, in accordance with an embodiment of the present invention.

FIGS. 7A-7D illustrate exemplary views of the drying unit of the proposed device, in accordance with an embodiment of the present invention.

FIGS. 13 to 24 illustrate various interfaces of mobile computing devices associated with a user of the proposed device.

DETAILED DESCRIPTION

Figure 1A:
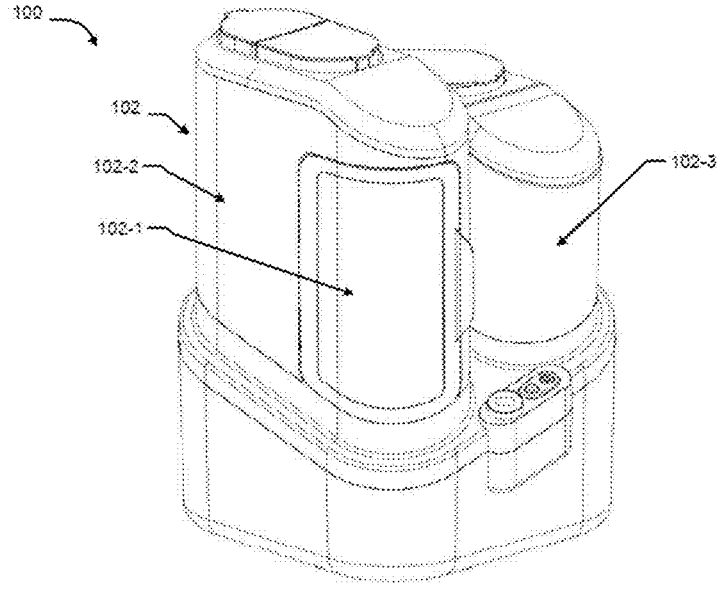
FIGS. 1A-1C illustrate exemplary views of the proposed bottle cleaning device with a fluid dispenser, in accordance with an embodiment of the present invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present disclosure relates generally to the field of cleaning devices and fluid dispensers. In particular, the present disclosure relates to a portable, automated, efficient, and remotely operable bottle cleaning device for cleaning, drying, and sterilizing bottles and corresponding accessories, and which can automatically fill fluid such as milk, and water in the cleaned bottle.

In an embodiment, the disclosed cleaning device includes two separate towers for receiving bottles and accessories, such as bottle cap, filter, collar, and nipple, in separate towers. A first tower holds the bottle in a holder and creates a whirl of water being heated at 100° C., but not limited to the likes, inside and around the bottle to completely wash the bottle. Further, upon washing, the holder moves the washed bottle such that the bottle is inclined to drip any water present inside the bottle, and the bottle is positioned in front of a dryer that provides filtered heated air to completely dry the washed bottle. Furthermore, the holder moves the dried bottle in front of UV lights to completely sterilize the bottle to kill any microorganism present on the surface of the bottle. Finally, the device includes a milk dispenser that is capable of preparing and filing milk in the cleaned bottle.

In an embodiment, a second tower accommodates the accessories of the bottle and creates a whirl of water being heated at 100° C. to completely wash the accessories. Further, upon washing, filtered heated air is provided in the second tower to completely dry the washed accessories. Furthermore, UV lights are provided in the second tower to completely sterilize the accessories to kill any microorganism present on the surface of the accessories.

In an embodiment, the milk dispenser includes a RO water container connected to a heating element to heat RO water at 45° C., but not limited to the likes, and a milk container to store and provide a fixed amount of milk powder. The RO water container and milk container are connected to a funnel that receives the heated RO water and milk powder and creates a turbine effect to mix the RO water and mike powder to prepare milk. Further, the prepared milk is dispensed in the cleaned bottle.

As a result, the device is capable of washing, sterilizing, and drying bottles and corresponding accessories, along with preparing and filing milk in the cleaned bottle, in a single device.

In an embodiment, the device includes a communication unit to allow the device to be remotely monitored and controlled by the user using mobile phones, tablets, and the likes. Further, the device also includes a control panel and buttons to allow the user to start the device and select from the various modes of operation, post which, the device automatically operates. As a result, the device is remotely monitorable and operable.

In another embodiment, the device is capable of automatically calculating the milk consumption of the baby, and also capable of estimating bottle size in case the capacity of the bottle is not known to the user. The device allows the user to schedule the function of the device in advance, and can even set reminders for it. This function allows the device to remind the user about the baby's diet plan regularly so that not a single feeding time is missed, even if the user forgets.

Figure 1B:
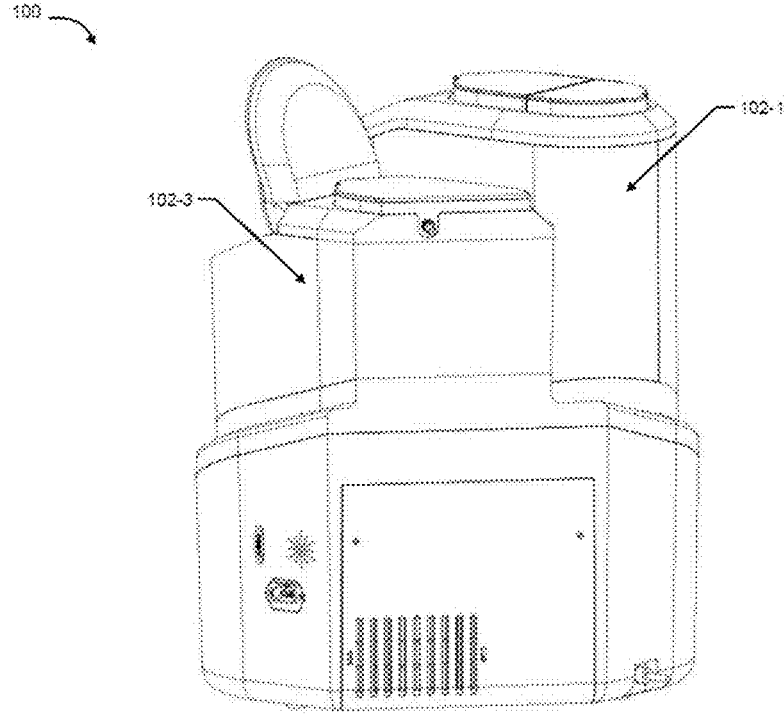
Figure 1C:
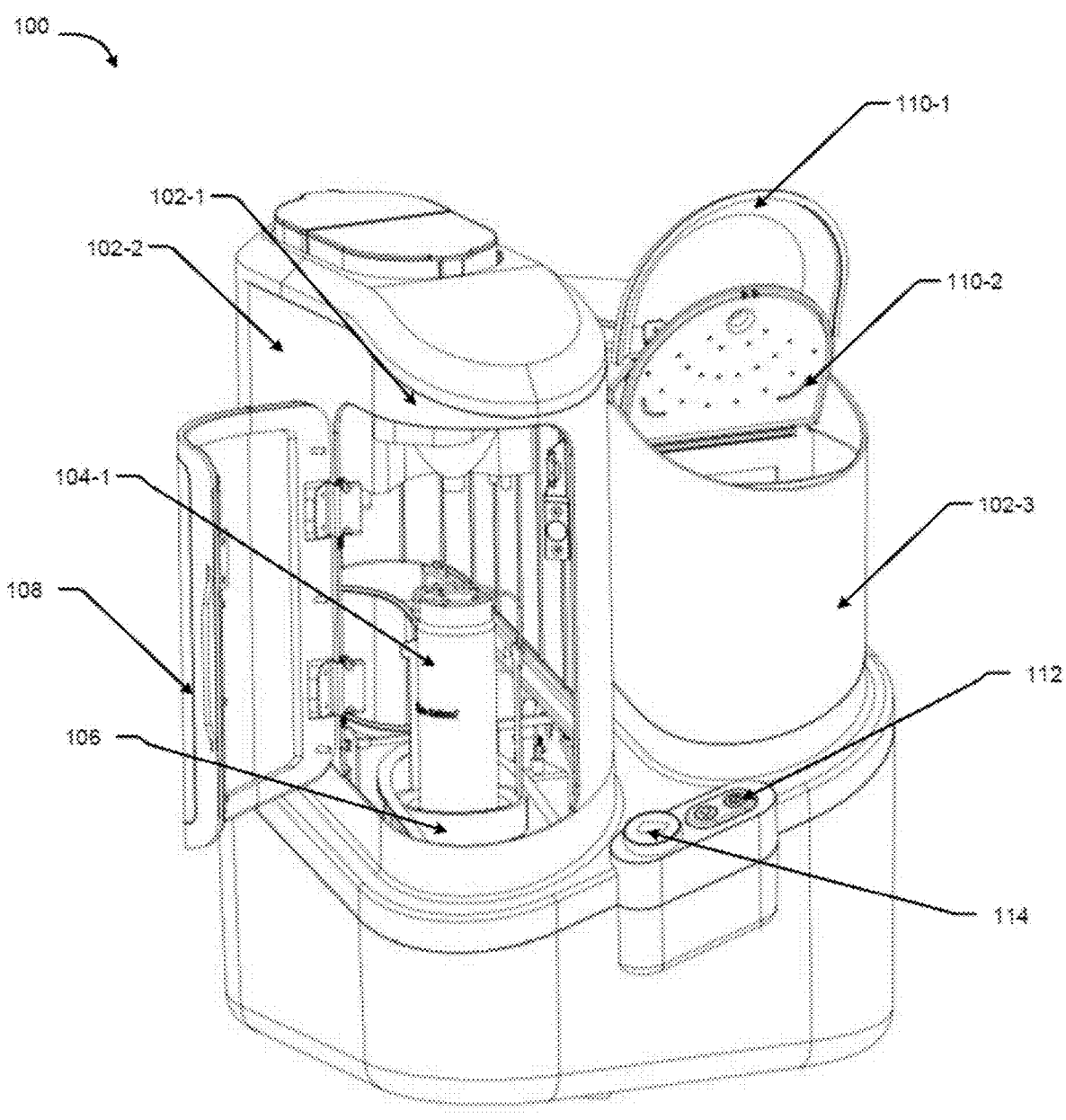

Referring now to FIGS. 1A-1C, in an aspect, the present disclosure provides a bottle cleaning device 100 (interchangeably referred to as device 100, hereinafter). The device 100 includes a housing 102 defining one or more compartments. In an illustrative embodiment, the device 100 can include three compartments, i.e., first compartment 102-1 (compartment 102-1), second compartment 102-2

(compartment 102-2), and third compartment 102-3 (compartment 102-3). The compartments 102-1 and 102-2 can be configured in a first tower, and third compartment 102-3 can be in a second tower of the housing 102. In an embodiment, the housing 102 can be adapted to receive one or more objects 104 selected from a bottle 104-1, and one or more accessories 104-2 of the bottle including a bottle cap, filter, collar, and nipple, and the likes.

In an embodiment, the device 100 can include a holder 106 (also referred to as docking assembly) movably configured within the housing 102, where the holder 106 can be configured to receive and hold at least one of the one or more objects, say the bottle 104-1. In another embodiment, the holder 106 can move the received bottle 104-1 between a first position and a second position. At the first position, the holder 106 can be within the first compartment 102-1 of the housing 102 and can be adapted to receive and hold the corresponding bottle 104-1. Further, at the second position, the holder 106 can move within the second compartment 102-2 to further facilitate washing, drying, and sterilization of the bottle 104-1.

In yet another embodiment, at the first position, the holder 106 can hold the bottle 104-1 in an upright position within the first compartment 102-1 such that an opening of the received object is on top. Further, at the second position, holder 106 can hold the bottle 104-1 in an inverted position such that the opening of the received object is at the bottom.

Still, in yet another embodiment, when the holder 106 moves the received bottle 104-1 to the second position, the second compartment 102-2 can receive a first predefined amount of water being heated at a first predefined temperature, and can further create a whirl of the received heated water for a first predefined time to facilitate the cleaning of bottle 104-1. The heated water cleaning cycle can be repeated for a predefined cycle, until the bottle 104-1 is completely clean. Further, the water-cleaned bottle 104-1 can be dried and sterilized in the same second compartment 102-2.

In another embodiment, the third compartment 102-3 can be configured to receive and hold the remaining objects, say the accessories 104-2. The third compartment 102-3 can receive a fourth predefined amount of water being heated at a first predefined temperature, and can further create a whirl of the received heated water for a first predefined time to facilitate of accessories 104-2. The third compartment 102-3 can further facilitate drying and sterilization of the accessories 104-2.

In an implementation, the bottle 104-1 and the accessories 104-2 can be washed with the water heated at the first predefined temperature of 100° C., but not limited to the likes. Further, the bottle 104-1 and the accessories 104-2 can be washed for two-cycles, each for a minute to complete the wash cycle, but not limited to the likes. After every cycle, dirty water can be released or drained through an outlet provided in the second compartment 102-2 and the third compartment 102-3.

In one embodiment, the first compartment 102-1 can include a lid/door 108 that can be opened to facilitate placement of the bottle 104-1 within the holder 106 of the first compartment 102-1, and then the lid 108 may be closed. In an exemplary embodiment, door 108 can be magnetic, but not limited to the likes. In other embodiment, the third compartment 102-2 can include an outer lid 110-1 and an inner lid 110-2, where the lids 110-1, 110-2 can be configured with a gasket to restrict leakage of water from the second compartment 102-2.

In an embodiment, the second compartment 102-2 can be fluidically coupled to a first container storing water or a water source, which can be operatively coupled to a first heating unit to heat the water at the first predefined temperature. Further, the second compartment 102-2 can be adapted to receive the heated water when the holder 106 moves received object 104-2 within the second compartment 102-2.

In an embodiment, the third compartment 102-3 can be fluidically coupled to a second container storing water or a water source, which can be operatively coupled to a second heating unit to heat the water at the first predefined temperature. Further, the third compartment 102-3 can be adapted to receive the heated water when the third compartment 102-3 is closed by the lids 110-1 and 110-2.

In an embodiment, the device 100 can include a fluid dispenser configured with the first compartment 102-1, and configured to dispense, within the bottle 104-1, a second predefined amount of one or more fluids selected from milk, and water, being heated at a predefined temperature, once the holder 106 moves back the cleaned, dried, and sterilized bottle 104-1 to the first position.

In an embodiment, the device 100 can include a control panel 114 operatively coupled to a processing unit, and configured with one or more buttons 112, which can be operated to actuate the control panel 114 to monitor and control one or more operations of the device 100. The device 100 can include a communication unit operatively coupled to the processing unit to communicatively couple the device 100 to one or more mobile computing devices of a user. The mobile computing devices can allow the user to remotely monitor and control one or more operations of the device 100.

FIGS. 13 to 24 illustrate various interfaces of mobile computing devices associated with a user of the proposed device. The device 100 can allow the user to monitor and calculate the amount of fluid or milk being consumed by the user/baby, and also calculate the everyday wastage of milk if the baby is not drinking milk properly. The device 100 can also remind the user/parents about the baby's drinking as per a schedule provided by the user/parents, and also tracks the baby's nutrition.

Referring to FIG. 14, in an embodiment, the processing unit of the device 100 can receive, from the mobile computing devices of the user, a first set of data packets pertaining to age, weight, gender, and ethnicity of the user, and the processing unit can correspondingly calculate an amount of milk or fluid to be consumed by the user based on paediatric recommendations.

Figure 15:
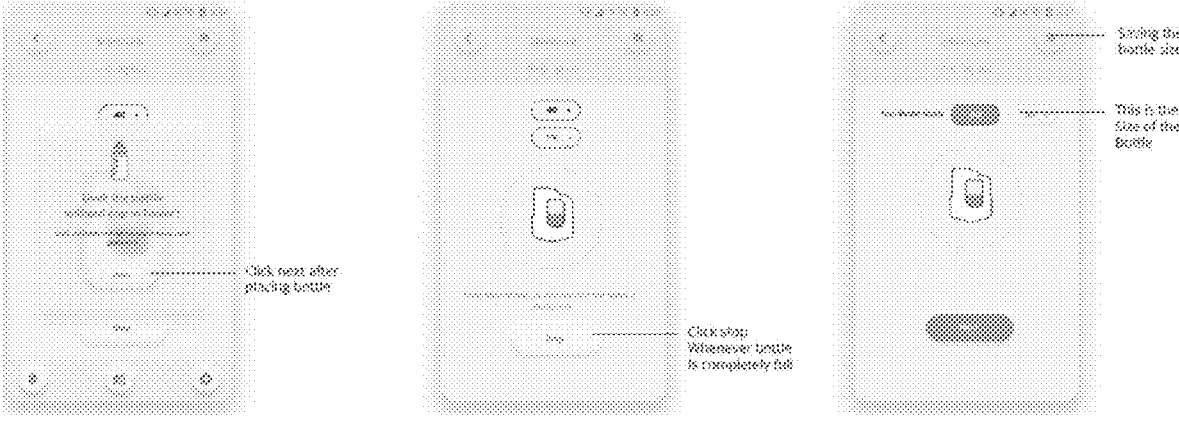

Referring to FIG. 15, in an embodiment, while using the proposed device 100, if the capacity of the bottle is not known, the device 100 can calculate and provide the estimated capacity of the bottle to the user. In an implementation, the bottle can be simply placed inside the device after which the user can click on next. The device 100 can then dispense water into the bottle and can keep track of the quantity (of water). Once the user notices the bottle getting filled with water, the user can press the stop button on the device, which will stop the water flow. Accordingly, the app or mobile computing device can calculate the total volume of water dispensed in the bottle by the help of a water flow sensor (present in the device), and can correspondingly display the size of the bottle on the mobile computing device of the user.

Figure 16:
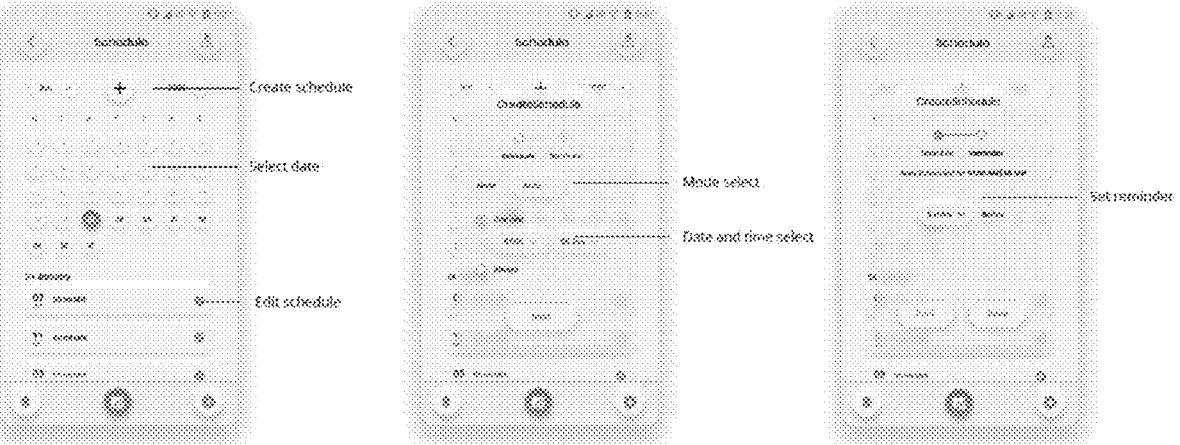
Figure 17:
Figure 18:
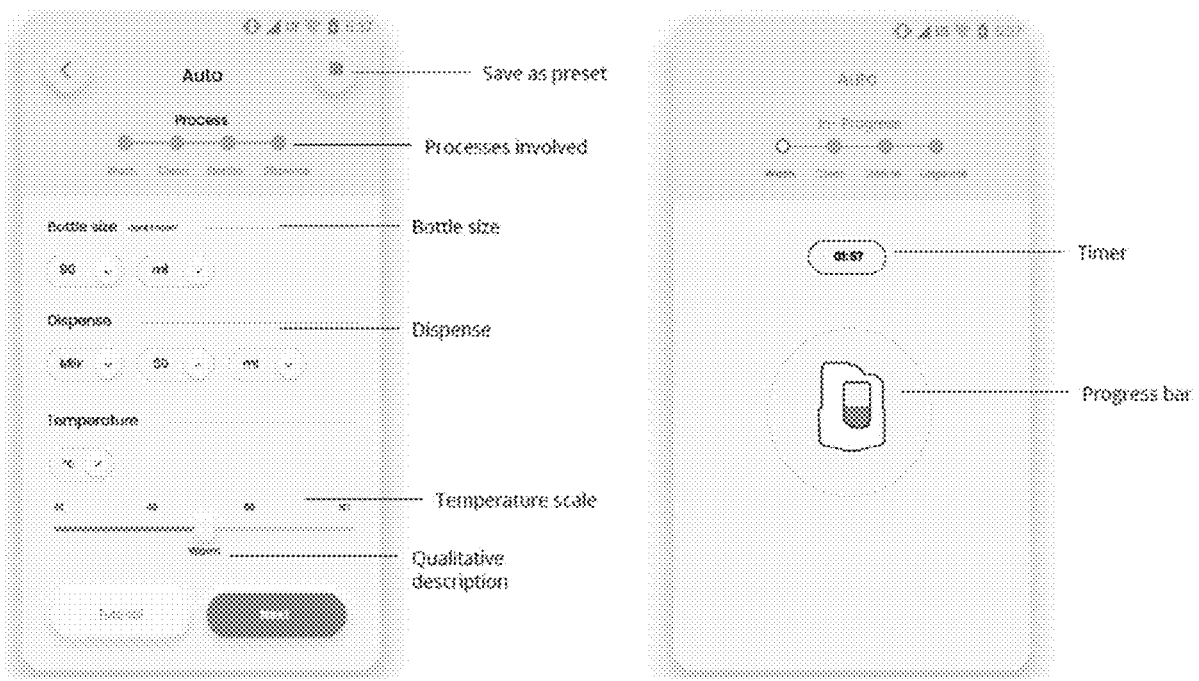
Figure 20:
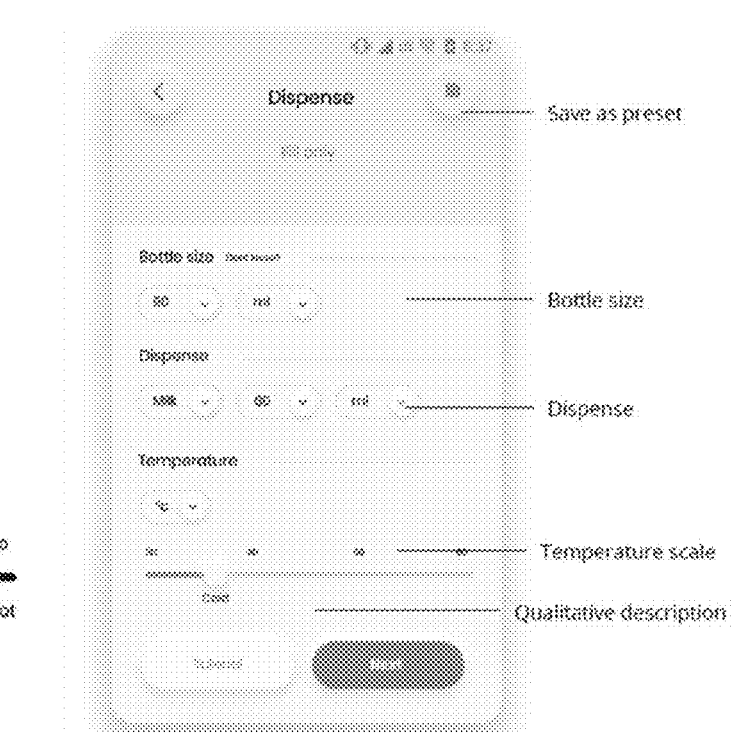
Figure 21:
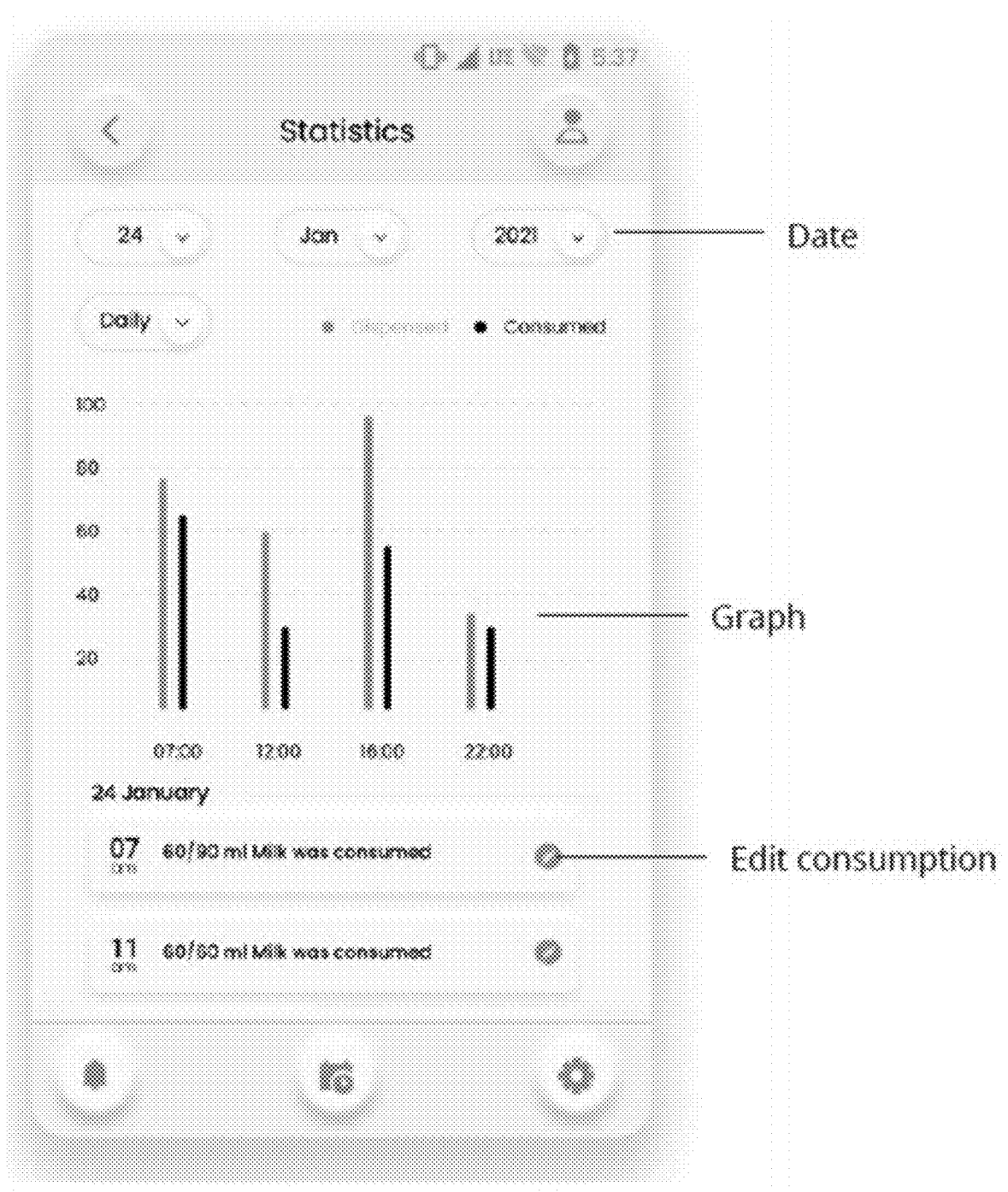

Referring to FIG. 16. In an embodiment, the processing unit of the device 100 can be configured to receive, from the mobile computing devices of the user, a second set of data packets pertaining a diet plan of the user, and the processing unit can correspondingly transmit a set of alert signals to the mobile computing devices to alert the user. In an implementation, the user can schedule the functions of the device 100 in advance and can even set reminders for it. This function can help remind the user about the baby's diet plan regularly so that not a single feeding time is missed. This function can also make the milk in proper time even if the user forgets.

Referring to FIGS. 17 to 21, in an embodiment, the mobile computing devices of the user can allow the user to operate the device in multiple modes selected from auto mode. The clean only mode, dispense only mode, and Measure and Track mode. In auto mode, all the functions including washing, drying, sterilizing of the bottle happens automatically. The user only needs to set the amount of milk required to be dispensed in the bottle using the control panel 114 or using the mobile computing device. Further, a status bar on the app can indicate the current stage of the process. In clean mode, the user can have the freedom to choose only the clean option. This includes washing, drying, and sterilizing the bottle and accessories. Users can either clean all (Bottle+accessories) or can clean either of them. In dispense mode, device 100 can only perform the fluid dispensing function. Users can select the parameters for dispensing using the mobile computing device. Further, the user can select dispense milk or water by selecting through the options provided on the app. In measure and track mode, the app can track the amount of milk/fluid consumed and/or wasted daily as the user can put the units by selecting the options from the app.

Figure 22:
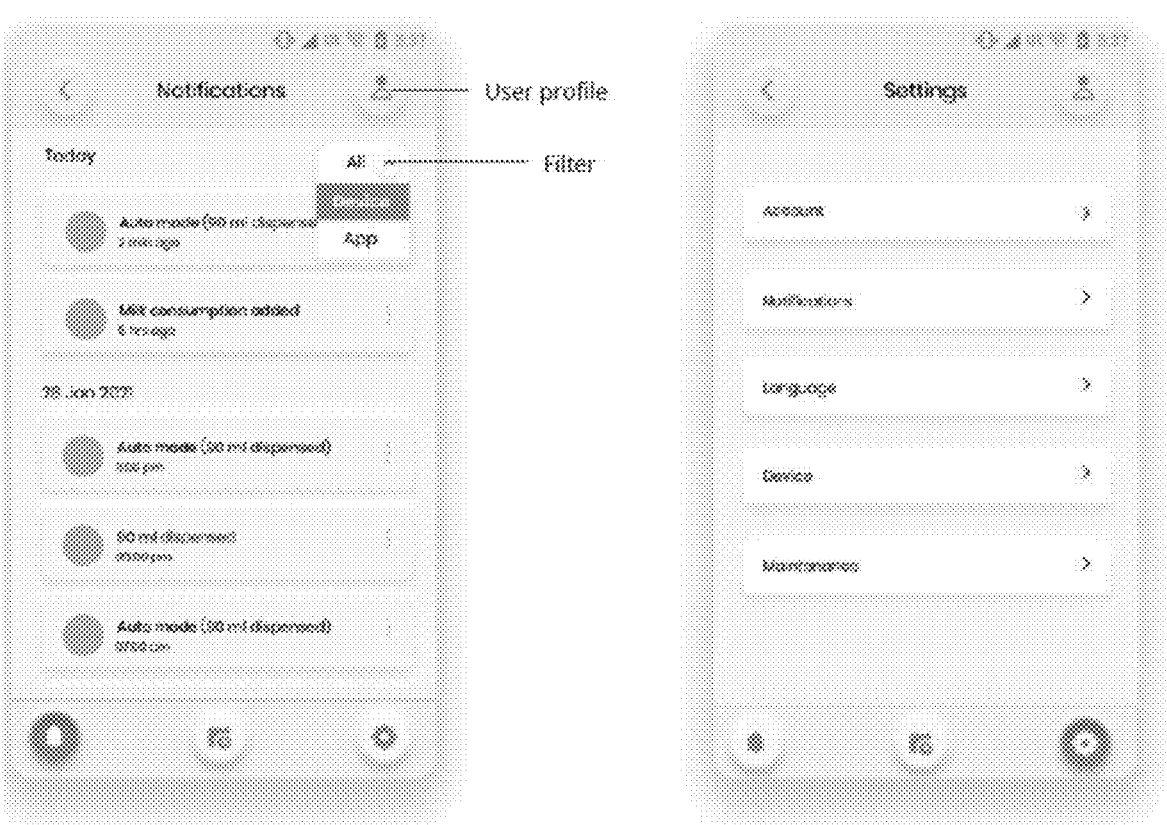
Figure 23:
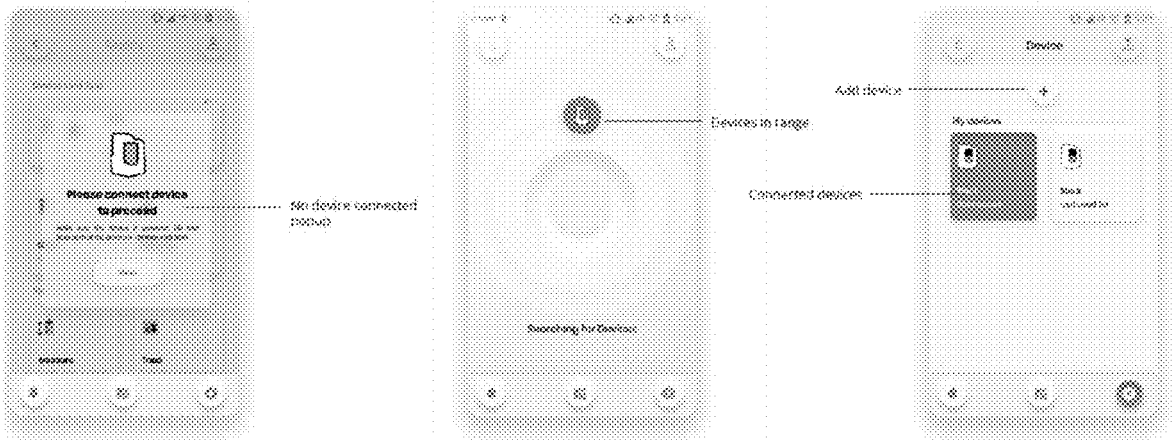

Referring to FIG. 22, in addition, the app can allow the user to go through notifications, and setting options, through which, the user can select the parameters for dispensing. The user can dispense milk or water by selecting through options. Further, referring to FIG. 23, the app can provide the user with the details about the mobile computing devices connected to the proposed device 100. Referring to FIG. 24, the app can also provide the user to select between two or more color theme options.

In an exemplary embodiment, the mobile computing devices can be selected from a mobile phone, tablet, laptop, handheld devices, computer, and the likes. In another exemplary embodiment, the communication unit can be selected from WiFi Module, Bluetooth Module, transceiver, wired media, and wireless media, and the likes.

In an embodiment, the device 100 can include a power supply unit configured to electrically couple the device 100 to a power source selected from batteries, and/or an alternating current (AC) or direct current (DC) power supply.

Referring to FIGS. 2A-2C, the holder 106 can include an object holding mesh 106-2, which can be made of hard wire being twisted to form a hook-shaped structure. In another embodiment, the holder 106 can include an object holding cap 106-1 positioned below the object holding mesh 106-2. In one embodiment, upon applying pressure on the object holding cap 106-1, the object holding cap 106-1 can be configured to move away from the object holding mesh 106-2 to allow positioning of the bottle 104-1 between the object holding mesh 106-2 and the object holding cap 106-1. In other embodiment, upon releasing the applied pressure, the object holding cap 106-1 can get pushed towards the object holding mesh 106-2 to lock the bottle 104-1 there between.

Figure 3A:
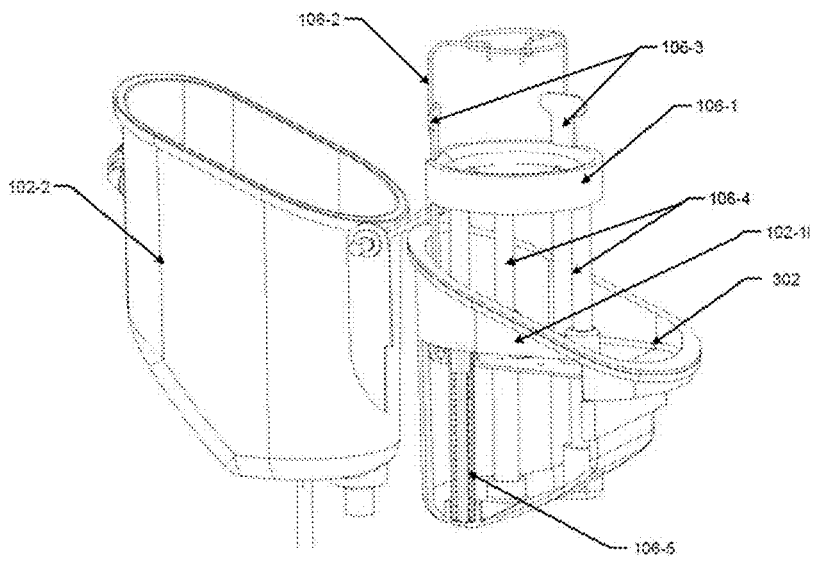
FIGS. 3A-3B illustrate exemplary views of the holder or docking assembly of the proposed bottle, in accordance with an embodiment of the present invention.
Figure 3B:
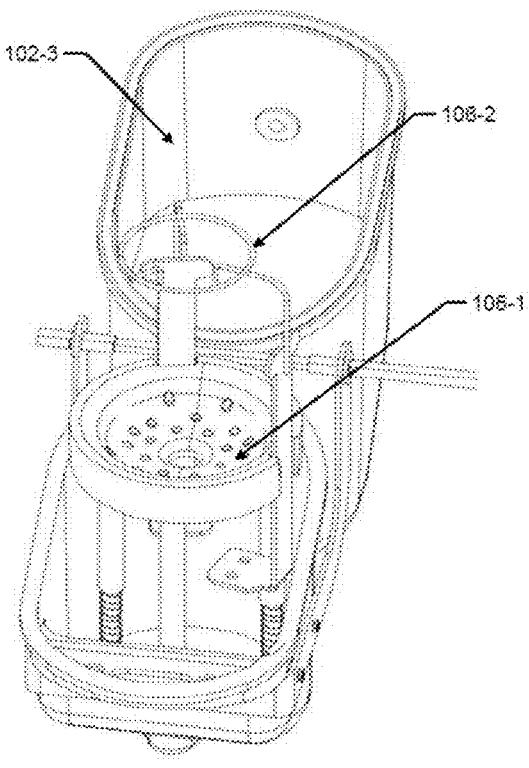

Referring to FIGS. 3A and 3B, the holder 106 can include the object holding mesh 106-2 being configured over a set of fixed pillars 106-3, and the object holding cap 106-1 can be configured over a set of spring-loaded pillars 106-4 being coupled with springs 106-5, and positioned below the object holding mesh 106-2. In one embodiment, the set of spring-loaded pillars 106-4, upon applying the pressure on the object holding cap 106-1, can be configured to allow movement of the object holding cap 106-1 away from the object holding mesh 106-2 to allow positioning of the bottle 104-1 between the object holding mesh 106-2 and the object holding cap 106-1. In other embodiment, upon releasing the applied pressure, the set of spring-loaded pillars 106-4 can push the object holding cap towards the object holding mesh 106-2 to lock the bottle 104-1 there between. In another embodiment, the first compartment 102-1 and the holder 106 can include a fluid collection basin 302 to collect and remove the one or more dispensed fluid from the first compartment 102-1.

Referring to FIGS. 6A-6E, in an embodiment, the second compartment 102-2 can include a first driving unit that can include a first set of blades 602 being rotatably coupled to a first motor 604, and operable to create the whirl of the received heated water 606. In another embodiment, the second set of blades 408, while rotating, can be configured to move inside and outside the received bottle 104-1, through the opening of the bottle 104-1, to create the whirl of heated water 608 inside the received bottle 104-1, as well as the whirl of heated water 606 around the bottle 104-1. Once the heated water 606 fills in the second compartment 102-2, the second set of blades 408 can move inside the bottle 104-1 to create the whirl inside the bottle 104-1.

Referring to FIG. 4A-4C, in an embodiment, the third compartment 102-3 can include a third driving unit comprising a second set of blades 402 being rotatably coupled to a second motor 406, and operable to create the whirl of the heated water being received inside the third compartment 102-3. The third compartment 102-3 can include a metal mesh 404 to secure the second set of blades 402, and avoid any damage to the accessories 104-2. The accessories 104-2 can rest over the metal mesh 404.

Figure 4E:
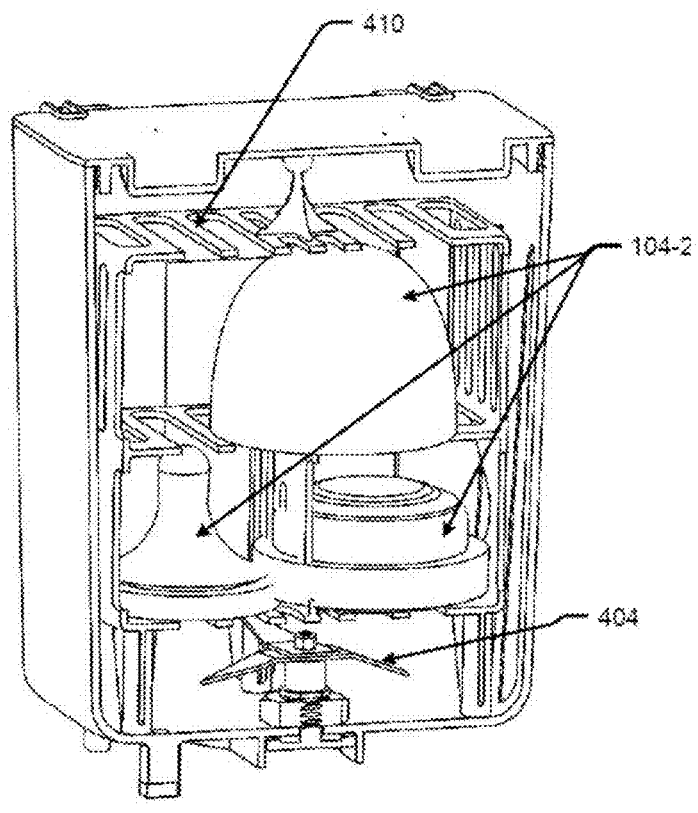
Figure 4F:
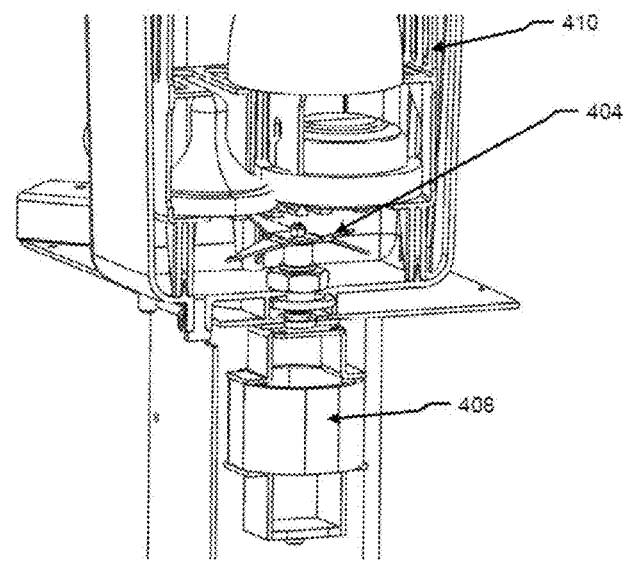

FIGS. 4E and 4F show an embodiment of the third compartment 102-3, wherein the compartment 102-3 includes a basket/rake 410 to receive and hold the remaining objects, say the accessories 104-2. Use of the basket/rake 410 shall result in increase in exposed surface area of the parts to enable better and more efficient cleaning, such as without bamage to the parts. It The basket/rake 410 can be transparent to allow passing of UV light during sterilization process.

Referring to FIGS. 7A and 7C, in an embodiment, the second compartment 102-2 can be operatively coupled to a first drying unit that can be configured to blow air being heated at a second predefined temperature inside the second compartment 102-2 and the bottle 104-1 to dry the water cleaned bottle 104-1. The first drying unit can include a first blower 702-1 being configured with a first heating element 704-1 to heat the air at the second predefined temperature, and supply the heated air inside the second compartment through a first air nozzle 710-1 provided at a first opening of the second compartment 102-2 through a pipe 706-1. The first drying unit can include a first air filter 708-1 to filter the air to be heated and supplied in the second compartment 102-2 so that the bottle 104-1 does not get contaminated.

Further, holder 106 can move the water cleaned object from the second position to a third position inside the housing 102 upon cleaning of the bottle 104-1, such that the opening of the water cleaned bottle 104-1 is in line with a first opening of the second compartment 102-2 to enable drying of the bottle 104-1. At the third position, the bottle 104-1 can be inclined at a first predefined angle with a longitudinal axis of the second compartment 102-2, to facilitate dripping out or removal of any water from the bottle 104-1. In another embodiment, the second compartment 102-2 can be configured to release the received or accommodated water from the second compartment 102-2 after the predefined time.

Referring to FIGS. 7B and 7C, in an embodiment, the third compartment 102-3 can be operatively coupled to a second drying unit that can be configured to blow air being heated at a second predefined temperature inside the third compartment 102-3 to dry the water cleaned accessories 104-2. The second drying unit can include a second blower 702-2 being configured with a second heating element 704-2 to heat the air at the second predefined temperature, and supply the heated air inside the third compartment through a second air nozzle 710-2 provided at a first opening of the third compartment 102-3 through a pipe 706-2. The second drying unit can include a second air filter 708-2 to filter the air to be heated and supplied in the third compartment 102-3 so that the accessories 104-2 do not get contaminated.

Figure 8:
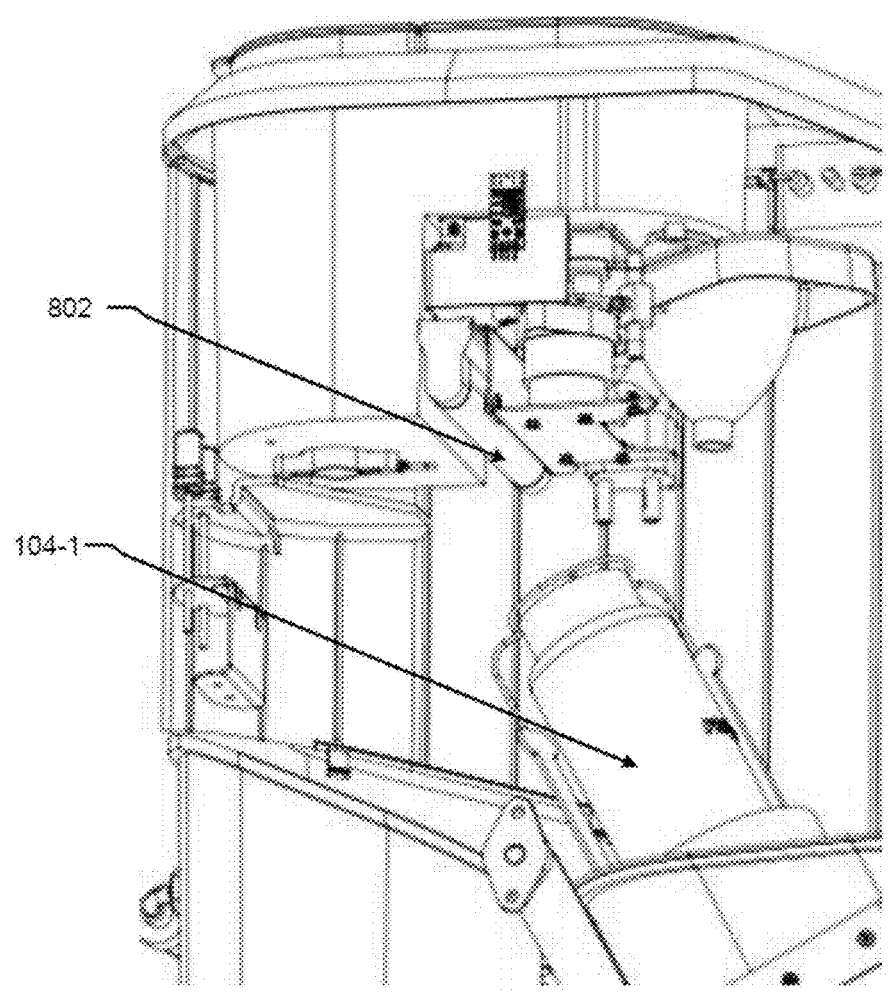
FIGS. 8, 9A and 9B illustrate exemplary views of the UV sterilization unit of the proposed device, in accordance with an embodiment of the present invention.

Referring to FIG. 8, in an embodiment, the second compartment 102-2 can include a set of UV lights 802 configured to sterilize the dried bottle 104-1 for a predefined time. In an embodiment, the holder 106 can move the dried bottle 104-1 from the third position to a fourth position inside the housing 102 upon drying of the bottle 104-1, such that the set of UV light 802 is around the dried bottle 104-1 to enable sterilizing of the bottle 104-1.

Figure 9:
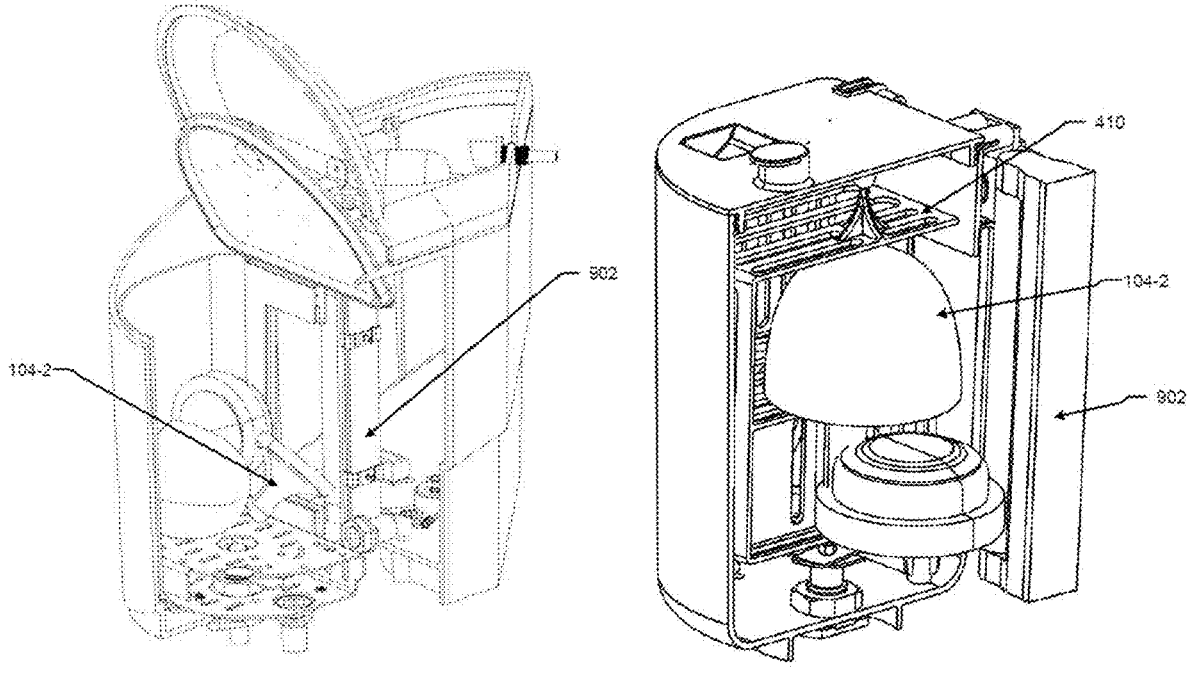

Referring to FIGS. 9A and 9B, in an embodiment, the third compartment 102-3 can include a set of UV lights 902 configured to sterilize the dried accessories 104-2 for a predefined time. The UV lights 802 and 902 can kill any microorganism left over an inside or outside surface of the dried objects 104. FIGS. 9A and 9B show different embodiments, wherein FIG. 9A shows the compartment 102-3 without the basket/rake 410, and FIG. 9B shows the basket/rake 410 to receive and hold the remaining objects, say the accessories 104-2, which result in increase in exposed surface area of the parts to enable better and more efficient sterilization.

Referring to FIGS. 5A-5C, in an embodiment, the holder 106 can be operatively coupled to a second driving unit comprising a linkage 502, and a motor and gear assembly 504, to move and position the holder at pre-defined positions between the first compartment to the second compartment and hold the bottle 104-1 at any of the first position, second position, third position, and fourth position. The motor and gear assembly 504 can be operatively coupled to the holder 106 or the first compartment 102-1 such as actuation of the motor can enable movement of the holder 106 at required positions.

Figure 10:
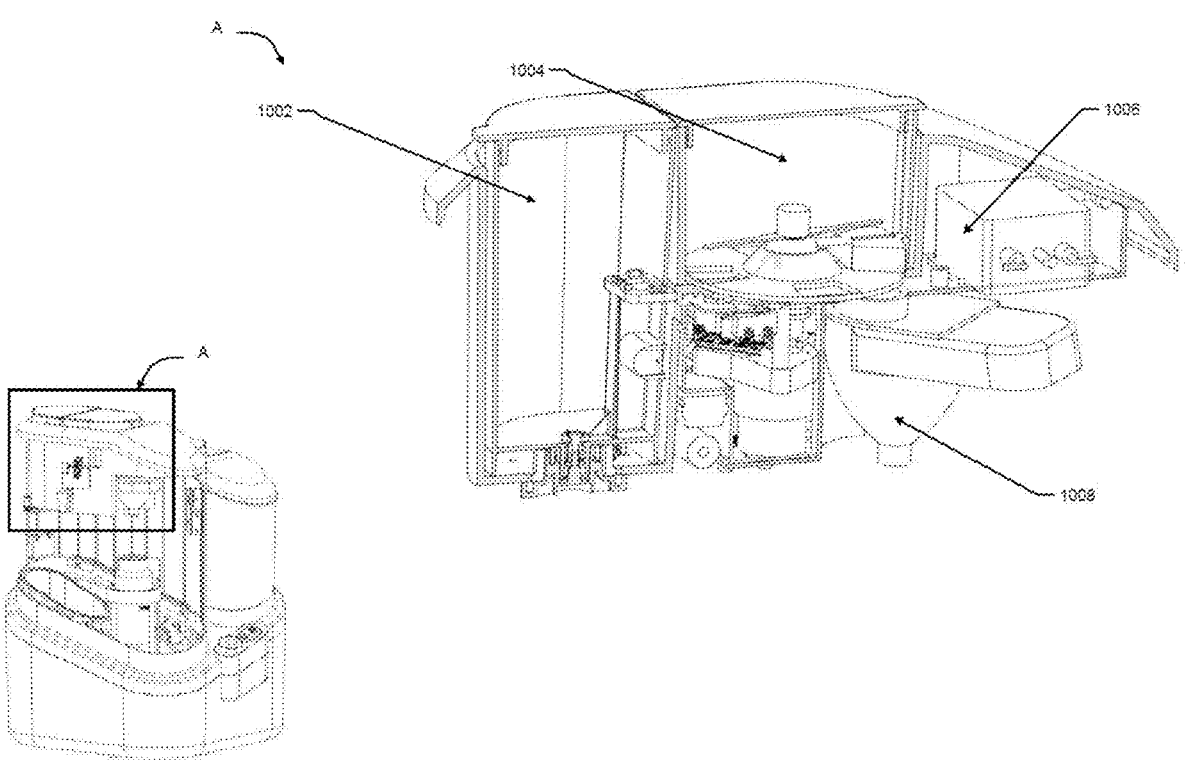
FIGS. 10 and 11 illustrate exemplary views of the fluid (milk) dispenser of the proposed device, in accordance with an embodiment of the present invention.
Figure 11:
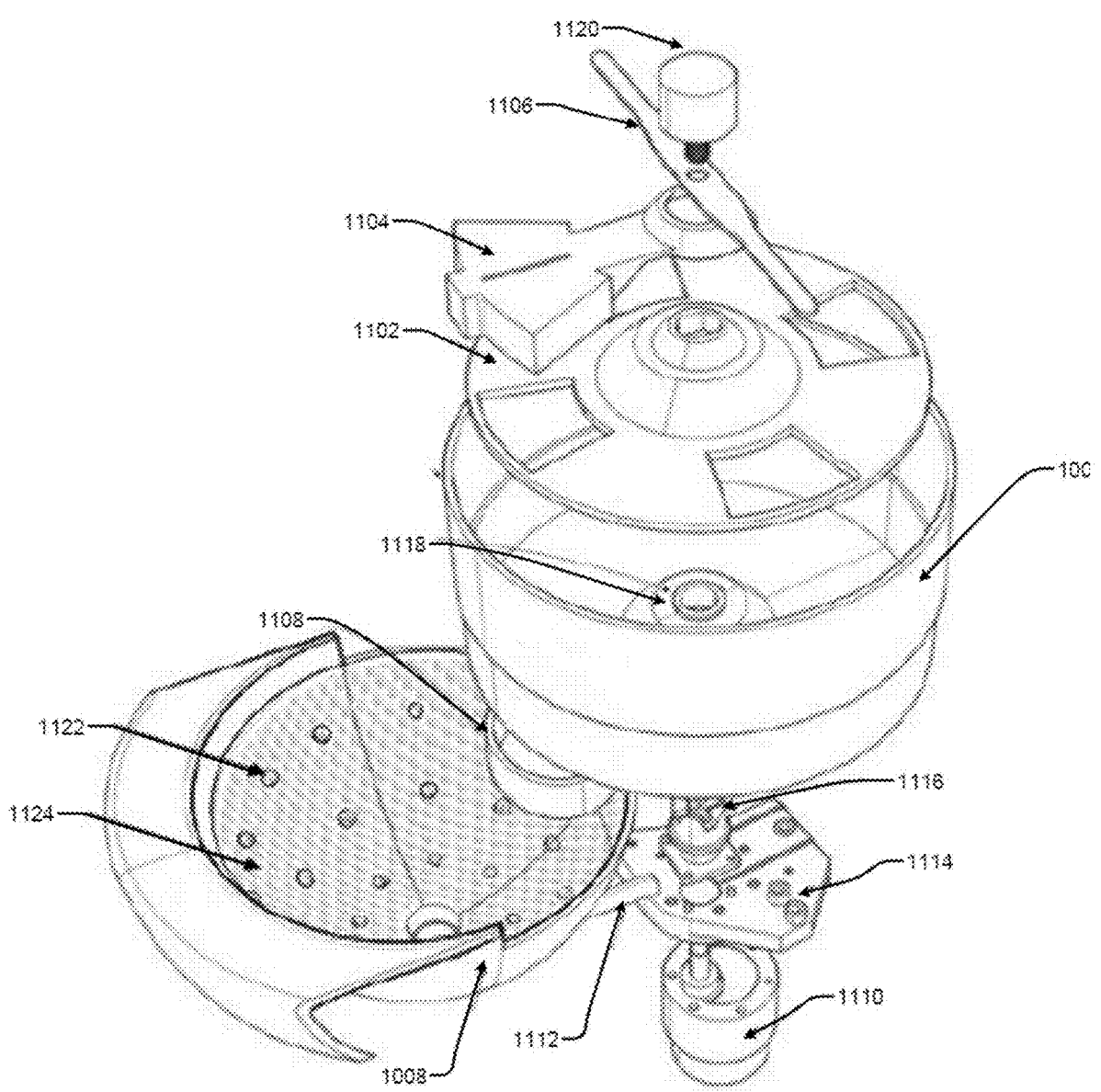

Referring to FIGS. 10 and 11, in an embodiment, the fluid dispenser (also referred to as milk dispenser, herein) can include a RO water container 1002 configured to store purified water, and operatively coupled with a heater 1006 to heat the stored water at a third predefined temperature, say 40° C., but not limited to the like. Further, a milk powder container 1004 can be configured to store and dispense a predefined quantity of milk powder. The milk dispenser can further include a funnel 1008 connected with the RO water container 1002 (though a pump), and the milk powder container 1004 to receive a third predefined amount of the heated RO water and the predefined quantity of the milk powder at the same time, and create a turbine action to facilitate mixing of the milk powder and the RO purified water to prepare milk, and further dispense the prepared milk within the bottle 104-1, when the cleaned bottle 104-1 move back to the first position, in an upright position beneath the milk dispenser.

In an embodiment, the milk powder container 1004 can be provided with a measuring disc 1102 having one or more slots, and a spatula 1104 rotatably configured over the measuring disc 1102 to dispense the predefined quantity of milk powder through the corresponding slots into the funnel 1008. Further, a set of blades 1106 can be configured within the milk powder container 1004 to facilitate uniform distribution of the stored milk powder. The spatula 1104 and/or the blades 1106 can be coupled to a motor 1110 through a shaft 1116. The milk powder container 1004 can be provided with a shaft opening 1118 to allow the shaft 1116 to pass through it and facilitate the connection of the blades with the motor 1110. Further, the milk powder container 1004 can include a dispensing spout 1108 to allow dispensing of the milk powder into the funnel 1004.

Figure 12:
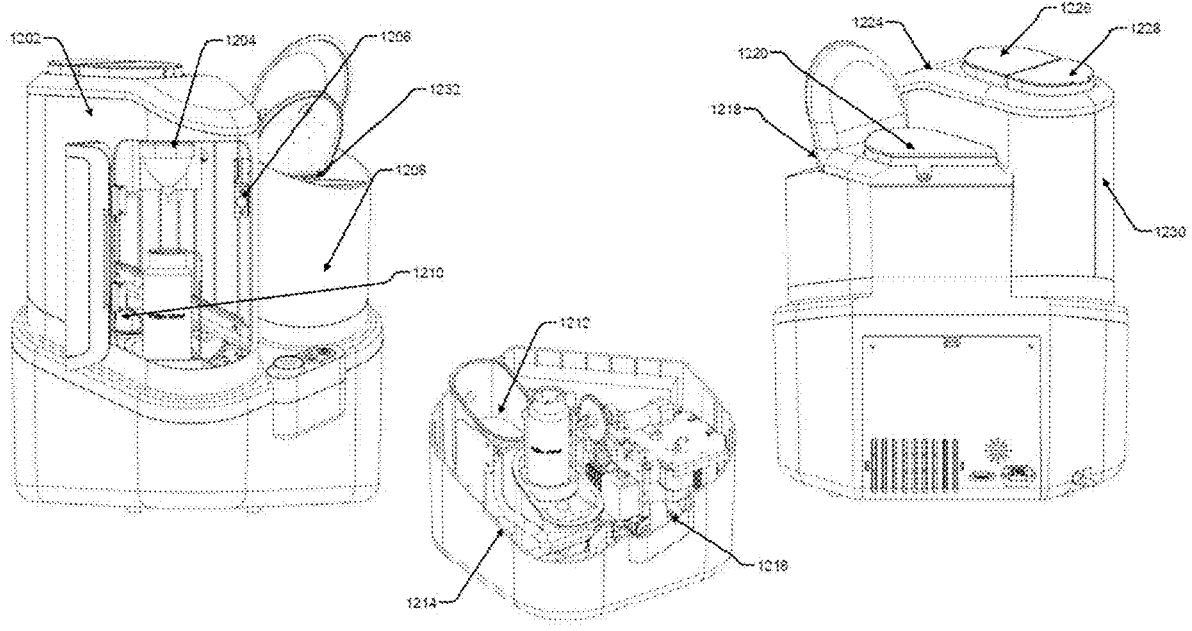
FIG. 12 illustrates the positions of different sensors in the proposed device, in accordance with an embodiment of the present invention.

Referring to FIG. 12, device 100 can include a set of infra-red (IR) sensors 1210 configured in the first compartment 102-1 and the third compartment 102-3, to detect the positioning of the object in the holder 106, and the third compartment 102-3, respectively. The device 100 can further include a limit switch 1204 configured with the door 108 of the first compartment to detect closing of the door 108, wherein the first compartment can be configured to receive the water and create the whirl of water upon detection of closing of the door 108 by the limit switch 1204.

In an embodiment, device 100 can include a hall sensor 1232 configured with the set of lids 110-1 and 110-2 to detect the closing of the lids 110-1, 110-2. The third compartment 102-3 can be configured to receive the water and create the whirl of water upon detection of closing of the lids 110-1, 110-2 by the hall sensors 1232.

In an embodiment, device 100 can include a float valve configured in the second compartment 102-2 and the third compartment 102-3 to control and provide the flow of the first predefined amount and the fourth predefined amount of the heated water in the second compartment 102-2 and the third compartment 102-3, respectively.

In an embodiment, device 100 can include a float level sensor configured in the RO water container 1002 to monitor and control the flow of the third predefined amount of the heated RO water from the RO water container 1002.

In an embodiment, device 100 can include a limit switch configured in the first compartment 102-1 to detect movement of the cleaned object back to the first position. The fluid dispenser dispenses the one or more fluids in bottle 102-1 when the limit switch detects movement of the cleaned object back to the first position.

In an embodiment, the device 100 can include a set of sensors 1226, 1228 configured in the RO water container 1002 and the milk powder container 1004, to monitor the level of the stored RO water, and the milk powder respectively, wherein the set of sensors 1226, 1228 are selected from any or a combination of a limit switch, hall sensor, and float level sensor.

In an embodiment, device 100 can include a temperature sensor 1224 configured in the RO water container 1002, to monitor the temperature of the stored RO water.

In an implementation, the device 100 can be provided with two bottles so that one bottle can be used by a user, and the other used bottle can be cleaned by the device 100, as required.

As illustrated, the processing unit of the proposed device 100 can include one or more processor(s). The one or more processor(s) can be implemented as one or more microprocessors, microcomputers, microcontrollers, digital signal processors, central processing units, logic circuitries, and/or any devices that manipulate data based on operational instructions. Among other capabilities, the one or more processor(s) are configured to fetch and execute computer-readable instructions stored in a memory of the processing unit. The memory can store one or more computer-readable instructions or routines, which may be fetched and executed to create or share the data units over a network service. The memory can include any non-transitory storage device including, for example, volatile memory such as RAM, or non-volatile memory such as EPROM, flash memory, and the like.

In an embodiment, the processing unit can also include an interface(s). The interface(s) can include a variety of interfaces, for example, interfaces for data input and output devices referred to as I/O devices, storage devices, and the like. The interface(s) can facilitate communication of the processing unit with various devices coupled to the processing unit. The interface(s) can also provide a communication pathway for one or more components of the processing unit. Examples of such components include, but are not limited to, processing engine(s) and database.

In an embodiment, the processing engine(s) can be implemented as a combination of hardware and programming (for example, programmable instructions) to implement one or more functionalities of the processing engine(s). In the examples described herein, such combinations of hardware and programming may be implemented in several different ways. For example, the programming for the processing engine(s) can be processor-executable instructions stored on a non-transitory machine-readable storage medium, and the hardware for the processing engine(s) can include a processing resource (for example, one or more processors), to execute such instructions. In the present examples, the machine-readable storage medium may store instructions that, when executed by the processing resource, implement the processing engine(s). In such examples, the processing unit can include the machine-readable storage medium storing the instructions and the processing resource to execute the instructions, or the machine-readable storage medium may be separate but accessible to the computing unit and the processing resource. In other examples, the processing engine(s) can be implemented by electronic circuitry. Database can include data that is either stored or generated as a result of functionalities implemented by any of the components of the processing engine(s).

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

We claim:

1. A bottle cleaning device with a fluid dispenser, the device comprising:
 a housing defining one or more compartment, and adapted to receive one or more objects selected from a bottle, and one or more accessories, and
 a holder movably configured within the housing, the holder is configured to receive and hold the bottle, and move the receivedbottle between a first position and a second position, wherein at the first position, the holder is within a first compartment of the housing and is adapted to receive and hold the received bottle, and wherein at the second position, the holder moves within a second compartment, and
wherein when the holder moves the received bottle to the second position, the second compartment receives a first predefined amount of water being heated at a first predefined temperature, and creates a whirl of the received heated water for a first predefined time to facilitate cleaning of the received bottle wherein the holder, in the first position, holds the received bottle in an upright position within the first compartment such that an opening of the received bottle is on top; and wherein the holder, when moving the received bottle to the second compartment, is configured to turn over the bottle to an upside down position such that a first set of blades in the second compartment is able to move inside and outside of the bottle to create the whirl of heated water inside and around the bottle.

2. The device as claimed in claim 1, wherein the second compartment is fluidically coupled to a first container storing water, and the first container is operatively coupled to a first heating unit to heat the stored water at the first predefined temperature, wherein the second compartment is adapted to receive the heated water when the holder moves the bottle within the second compartment.

3. The device as claimed in claim 2, wherein the second compartment comprises a first driving unit comprising the first set of blades being rotatably coupled to a first motor, and operable to create the whirl of the received heated water.

4. The device as claimed in claim 2, wherein the second compartment is operatively coupled to a first drying unit that is configured to blow air heated at a second predefined temperature inside the second compartment to dry the water cleaned bottle, and wherein the first drying unit comprises a first blower configured with a first heating element to heat the air at the second predefined temperature, and supply the heated air to the second compartment though a first air nozzle provided at a first opening of the second compartment.

5. The device as claimed in claim 4, wherein the holder moves the water cleaned bottle from the second position to a third position inside the housing after water cleaning, such that the opening of the water cleaned bottle is in line with the first opening of the second compartment to enable drying of inside of the bottle.

6. The device as claimed in claim 5, wherein at the third position, the bottle is inclined at a first predefined angle with a longitudinal axis of the second compartment, to facilitate draining of any water from the bottle under gravity.

7. The device as claimed in claim 4, wherein the first drying unit comprises a first air filter to filter the air before being heated and supplied to the second compartment.

8. The device as claimed in claim 7, wherein the holder is configured to move the dried bottle from the third position to a fourth position inside the housing after drying, such that the set of UV light are around the dried bottle to enable sterilizing of the dried bottle.

9. The device as claimed in claim 4, wherein the second compartment comprises a set of UV lights configured to sterilize the dried bottle for a predefined time.

10. The device as claimed in claim 1, wherein the holder is configured to move the bottle back to the first position in the first compartment after cleaning of the bottlein the second compartment, and wherein the device comprises a fluid dispenser configured with the first compartment, and configured to dispense, within the bottle, a second predefined amount of one or more fluids selected from milk, and water, heated at a predefined temperature, after the holder has moves back the cleaned bottle to the first position.

11. The device as claimed in claim 10, wherein the milk dispenser comprises:

a RO water container configured to store RO purified water, and operatively coupled with a heater to heat the stored water at a third predefined temperature;

a milk powder container configured to store and dispense a predefined quantity of milk powder; and a funnel connected with the RO water container and the milk powder container to receive a third predefined amount of the heated RO water and the predefined quantity of the milk powder, and create a turbine action to facilitate mixing of the milk powder and the RO purified water to prepare milk, and further dispense the prepared milk within the bottle, when the cleaned bottle moves back to the first position.

12. The device as claimed in claim 11, wherein the milk powder container comprises a measuring disc having one or more slots, and a spatula rotatably configured over the measuring disc to dispense the predefined quantity of milk powder through the corresponding slots into the funnel.

13. The device with fluid dispenser as claimed in claim 1, wherein the holder is operatively coupled to a second driving unit to move and position the holder at pre-defined positions between the first compartment to the second compartment, and wherein the second driving unit comprises a motor-gear assembly operatively coupled to the first compartment using a linkage.

14. The device as claimed in claim 1, wherein the holder comprises:

an object holding mesh configured over a set of fixed pillars, the object holding mesh being made of a hard wire twisted to form a hook shaped structure, and an object holding cap configured over a set of spring-loaded pillars and positioned below the object holding mesh, wherein the set of spring-loaded pillars, on application of a pressure on the object holding cap, is configured to allow movement of the object holding cap away from the object holding mesh to allow positioning of the received bottle between the object holding mesh and the object holding cap, and wherein upon releasing the applied pressure, the set of spring-loaded pillars pushes the object holding cap towards the object holding mesh to lock the object there between.

\* \* \* \* \*